United States Patent
Takeshita

(10) Patent No.: US 11,747,791 B2
(45) Date of Patent: Sep. 5, 2023

(54) RECORDING MEDIUM STORING SYSTEM CONSTRUCTION ASSISTANCE PROGRAM, SYSTEM CONSTRUCTION ASSISTANCE METHOD, AND SYSTEM CONSTRUCTION ASSISTANCE DEVICE

(71) Applicant: Mitsubishi Electric Corporation, Tokyo (JP)

(72) Inventor: Naoki Takeshita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/918,565

(22) PCT Filed: Nov. 4, 2020

(86) PCT No.: PCT/JP2020/041212
§ 371 (c)(1),
(2) Date: Oct. 13, 2022

(87) PCT Pub. No.: WO2022/097202
PCT Pub. Date: May 12, 2022

(65) Prior Publication Data
US 2023/0124935 A1 Apr. 20, 2023

(51) Int. Cl.
*G05B 19/418* (2006.01)

(52) U.S. Cl.
CPC ... *G05B 19/4183* (2013.01); *G05B 19/41875* (2013.01)

(58) Field of Classification Search
USPC ....................................................... 700/95
See application file for complete search history.

(56) References Cited

U.S. PATENT DOCUMENTS 8,863,154 B2 * 10/2014 Mikami ............. H04L 41/0631
719/318
2010/0226561 A1 9/2010 Fujikawa et al.
(Continued)

FOREIGN PATENT DOCUMENTS

JP 2004-5400 A 1/2004
JP 2004-198148 A 7/2004
(Continued)

OTHER PUBLICATIONS

International Search Report and Written Opinion dated Jan. 12, 2021, received for PCT Application PCT/JP2020/041212, filed on Nov. 4, 2020, 8 pages including English Translation.
(Continued)

*Primary Examiner* — Hien D Khuu
(74) *Attorney, Agent, or Firm* — XSENSUS LLP

(57) ABSTRACT

A system construction assistance program causes a computer to execute a history creation step, an input step, a storage step, a search step, and a display step of displaying action information searched. The history creation step is for receiving a plurality of pieces of setting information indicating settings of production devices and storing the setting information. The input step is for receiving an input of action information indicating an action against an abnormality. The storage step is for storing the action information and the change content of the setting information accompanying occurrence of the abnormality in association with each other. The search step is for searching, in a case of occurrence of an abnormality in the production devices, for the action information for the abnormality occurring in the production devices from among the stored action information, using as a search condition the change content of the setting information.

20 Claims, 21 Drawing Sheets

(56) References Cited

U.S. PATENT DOCUMENTS

2017/0153608 A1* 6/2017 Ueda .................... G05B 19/409
2017/0357543 A1* 12/2017 Otsuka ................. G06F 11/079
2018/0059657 A1 3/2018 Kamoi et al.
2020/0241503 A1 7/2020 Nakanishi

FOREIGN PATENT DOCUMENTS

| | | | |
|---|---|---|---|
| JP | 2005-71200 | * | 3/2005 |
| JP | 2007-140997 A | | 6/2007 |
| JP | 2010-191939 A | | 9/2010 |
| JP | 2013-105896 A | * | 5/2013 |
| JP | 6161849 B1 | * | 7/2017 |
| JP | 2018-36713 A | | 3/2018 |
| JP | WO2017/208391 A1 | * | 6/2018 |
| JP | 2020-119428 A | | 8/2020 |
| KR | 10-0576819 B1 | * | 5/2006 |

OTHER PUBLICATIONS

Notice of Reasons for Refusal dated Jun. 29, 2021, received for JP Application 2021-516513,4 pages including English Translation.
Decision to Grant dated Oct. 26, 2021, received for JP Application 2021-516513, 5 pages including English Translation.

* cited by examiner

FIG.5

| | PRODUCTION PIECE NUMBER PER SECOND | SETTING a OF DEVICE A | SOFTWARE w OF DEVICE B | ... |
|---|---|---|---|---|
| 001 | (3,3,3,3,3) | 20 | ver.4 | |
| 002 | (3,3,3,3,3) | 20 | ver.4 | |
| 003 | (3,3,3,3,3) | 20 | ver.4 | |

FIG.7

| No. | CHANGE CONTENT | ACTION INFORMATION | OTHERS | AVAILABILITY |
|---|---|---|---|---|
| 001 | • PRODUCTION PIECE NUMBER (3,3,3,3,3) → (1,1,1,1,1)<br>• SETTING a OF DEVICE A 20→10<br>• SOFTWARE w OF DEVICE B ver.4→ver.4<br>⋮ | CAUSE: SETTING a IS IMPROPER<br><br>ACTION METHOD: ADJUST SETTING a | ACTION DATE: 12/10/15<br><br>REMARK: N/A | DISABLE |
| 002 | • PRODUCTION PIECE NUMBER (3,3,3,3,3) → (3,2,3,2,3)<br>• SETTING a OF DEVICE A 20→20<br>• SOFTWARE w OF DEVICE B ver.4→ver.5<br>⋮ | CAUSE: PART P OF DEVICE A FAILS (AGING DETERIORATION)<br><br>ACTION METHOD: REPLACE PART P | ACTION DATE: 2/1/19<br><br>NOTE: N/A | ENABLE |

FIG.11

Describe action method and cause

Action Metod :

Cause :

Addressability : ☐  Check when available

Remark :

Registration

FIG.18

| Device Information Name | Latest history | Exclusion |
|---|---|---|
| Setting R of device A | 28 | ☐ |
| Production piece count per second | (2,2,2,2,2) | ☐ |
| Software S of device B | Ver.5 | ☐ |

Exclusion confirmation    Cancel

RECORDING MEDIUM STORING SYSTEM CONSTRUCTION ASSISTANCE PROGRAM, SYSTEM CONSTRUCTION ASSISTANCE METHOD, AND SYSTEM CONSTRUCTION ASSISTANCE DEVICE

CROSS-REFERENCE TO RELATED APPLICATION

The present application is based on PCT filing PCT/JP2020/041212, filed Nov. 4, 2020, the entire contents of which are incorporated herein by reference.

TECHNICAL FIELD

The present disclosure relates to a system construction assistance program, a system construction assistance method, and a system construction assistance device of a production system.

BACKGROUND ART

In system construction of a factory automation system, a system construction assistance device has been used that stores information relating to states and settings of a production device included in a production system and outputs, in a case of occurrence of an abnormality in the production device, a change of the information relating to the states and the settings of the production device caused by the occurrence of the abnormality.

For reference, Patent Literature 1 discloses a server including a production equipment information management system that automatically collects information such as a program or a parameter to be executed by a control device of production equipment and confirms presence or absence of a change of the collected information by comparison with information previously collected.

CITATION LIST

Patent Literature

Patent Literature 1: Unexamined Japanese Patent Application Publication No. 2004-5400

SUMMARY OF INVENTION

Technical Problem

A conventionally used system construction assistance device of the factory automation system does not have a function that provides information indicating an action against an abnormality. Thus, depending on skill of a user, there is heretofore sometimes difficulty of the user determining an effective action based on a change of the information relating to the output states and settings of the production device.

In view of the above circumstances, an objective of the present disclosure is to provide a system construction assistance program, a system construction assistance method, and a system construction assistance device that enable, in a case of occurrence of an abnormality in a production device, a user to easily determine an action against the abnormality.

Solution to Problem

A system construction assistance program according to the present disclosure causes a computer to execute instructions including receiving, using a reception device, a plurality of pieces of setting information indicating settings of a production device included in a production system and storing a history of the plurality of pieces of setting information in a storage device, in a case of occurrence of an abnormality in the production device, receiving, from an input device, an input of action information indicating an action against the abnormality, extracting, from the history of the plurality of pieces of setting information stored in the storage device, a change content of setting information accompanying occurrence of the abnormality and storing, in the storage device, the received input of the action information and the extracted change content of the setting information in association with each other, in a case of occurrence of an abnormality of the production device after the storing, searching for the action information for the abnormality occurring in the production device after the storing from among the action information stored in the storage device, using as a search condition the change content of the setting information accompanying the occurrence of the abnormality, and displaying the action information searched for on the display device.

A system construction assistance method according to the present disclosure includes receiving, using a reception device, a plurality of pieces of setting information indicating settings of a production device included in a production system and storing a history of the plurality of pieces of setting information in a storage device, in a case of occurrence of an abnormality in the production device, receiving, from an input device, an input of action information indicating an action against the abnormality, extracting, from the history of the plurality of pieces of setting information stored in the storage device, a change content of setting information accompanying occurrence of the abnormality and storing, in the storage device, the received input of the action information and the extracted change content of the setting information in association with each other, in a case of occurrence of an abnormality of the production device after the storing, searching for the action information for the abnormality occurring in the production device after the storing from among the action information stored in the storage device, using as a search condition the change content of the setting information accompanying the occurrence of the abnormality; and displaying the action information searched for on the display device.

A system construction assistance device includes a history creator to receive, using a reception device, a plurality of pieces of setting information indicating settings of a production device included in a production system and store a history of the plurality of pieces of setting information in a storage device, an inputter to receive from an input device, in a case of occurrence of an abnormality in the production device, an input of action information indicating an action against the abnormality, a storage to extract, from the history of the plurality of pieces of setting information stored in the storage device, a change content of setting information accompanying occurrence of the abnormality and store, in the storage device, the action information input by the inputter and the extracted change content of the setting information in association with each other, a searcher to search, in a case of occurrence of an abnormality in the production device, for the action information for the abnormality from among the action information stored in the storage device by the storage, using as a search condition the change content of the setting information accompanying the occurrence of the abnormality, and a display to display the action information searched for by the searcher on the display device.

Advantageous Effects of Invention

The present disclosure can provide a system construction assistance program, a system construction assistance method, and a system construction assistance device that enable, in a case of occurrence of an abnormality in a production device, a user to easily determine an action against the abnormality.

BRIEF DESCRIPTION OF DRAWINGS

FIG. 5 is a diagram illustrating information of a history data file storing history information in Embodiment 1;
FIG. 7 is a diagram illustrating information of an action information data file storing action information in Embodiment 1;
FIG. 11 is a diagram illustrating an example of a registration screen in Embodiment 1;
FIG. 18 is a diagram illustrating an example of a setting screen in Embodiment 2.

Embodiment 1

Figure 1:
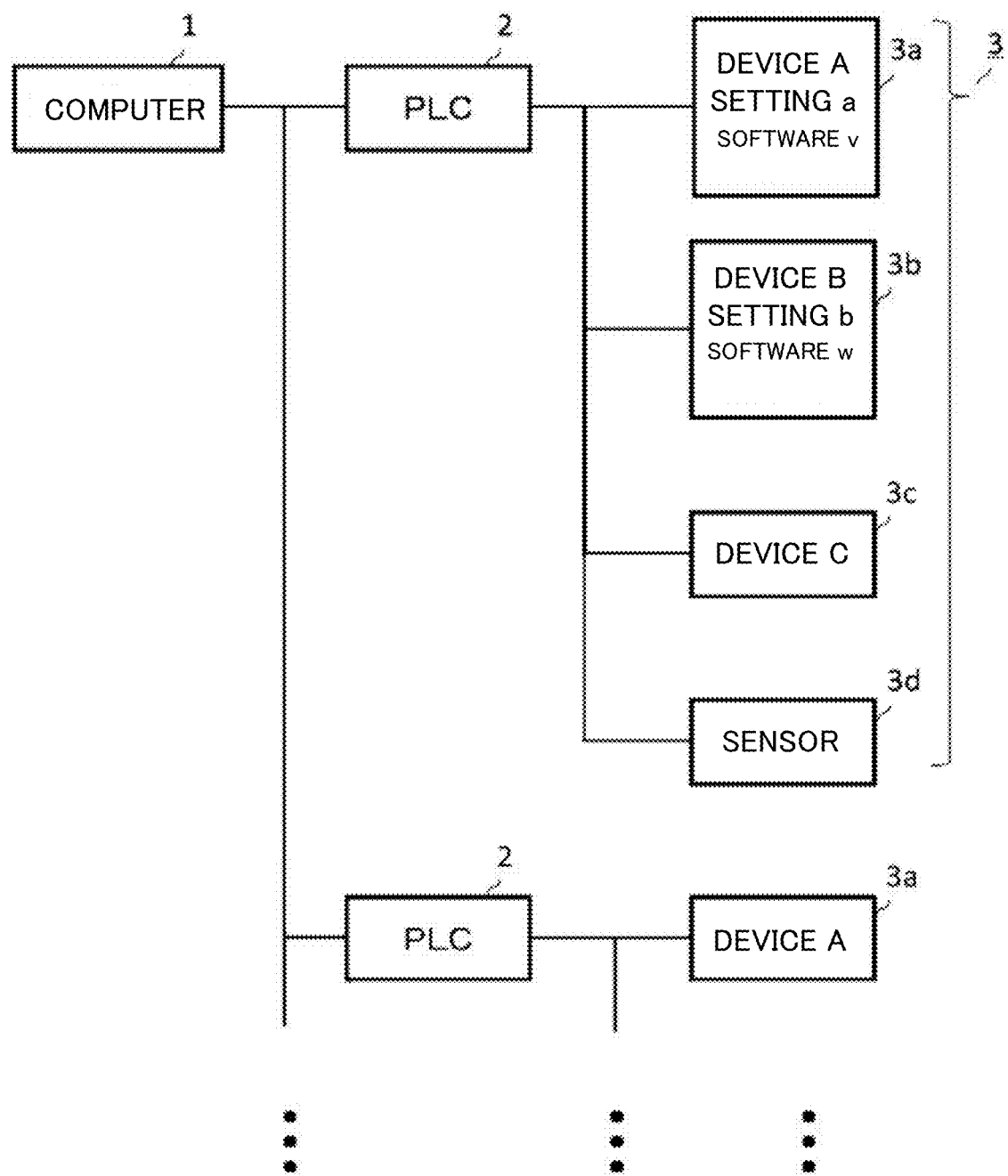
FIG. 1 is a diagram illustrating an overall factory automation system in Embodiment 1.

A system construction assistance program, a system construction assistance method, and a system construction assistance device according to Embodiment 1 are described hereinafter in detail with reference to the drawings. The same reference numerals are used throughout the drawings to refer to the same or equivalent configurations and steps.

An example of a factory automation (FA) system is described as a production system for which a system construction assistance device of the present embodiment is applied. FIG. 1 is an overall diagram of the FA system in Embodiment 1 of the present disclosure. This FA system includes a computer 1 that is the system construction assistance device. First, an outline of a configuration of the overall FA system is described using FIG. 1.

The FA system includes a computer 1, a plurality of programmable logic controllers (PLC) 2 connected to the computer 1, and a plurality of devices 3 connected to the PLCs 2. The production device in the description below is a device included in the FA system and connected to the computer 1. In the present embodiment, the production devices refer to the devices 3 connected to the computer 1 via the PLCs 2.

The computer 1 acquires device information from the PLCs 2 that control the devices 3, and stores the device information as a history. The PLCs 2 control the devices 3 and acquire the device information from the devices 3 and stores the device information. The PLC 2 is a controller that outputs the device information to the computer 1 in accordance with an output instruction from the computer 1. In the present disclosure, the device information includes at least one of state information indicating a state of the production device or setting information indicating a setting of the production device. Specific examples of the device information are described later in the description of operation.

The devices 3 are devices connected to the PLC 2, such as an industrial robot, a temperature sensor, and an emergency stop button. In the present embodiment, a device A 3a, a device B 3b, a device C 3c, and a sensor 3d are connected as the devices 3 to the PLC 2.

Here, one setting of parameter settings of the device A 3a is assumed to be a and one of versions of software programs installed in the device A 3a is assumed to be v. Also, one setting of parameter settings of the device B 3b is assumed to be b and one of versions of software programs installed in the device B 3b is assumed to be w. Such information is setting information indicating the settings of the production device.

Outline of System Construction Assistance Device

The system construction assistance device of the present embodiment provides a user with an action against a newly occurring abnormality based on action information against a past abnormality. For example, a case may be supposed where a device A and a device B are provided in the same production line, pre-processing is performed with the device A, and finish processing is performed with the device B. The pre-processing and the finish processing are performed on the same portion of a target product and the pre-processing is needed to be applied in accordance with the finish. In this case, change may happen to be made only in the setting information of the device B for adjustment of a degree of the finish processing, but making a change of the setting information of the associated device A is forgotten, which may cause an abnormality in a post-process of the production line, for example, a process by the device C. Thus, in a case where a causal connection between the abnormality and the cause is hard to understand, a problem may occur in that time-consuming finding of the cause or a proper action results in stoppage of the production line.

In such a situation, the system construction assistance device of the present embodiment can promptly find an action against an abnormality in the past occurring after change of only the setting information of the device B, that is, an action of changing the setting information of the device A, and can present the action to the user.

Figure 2:
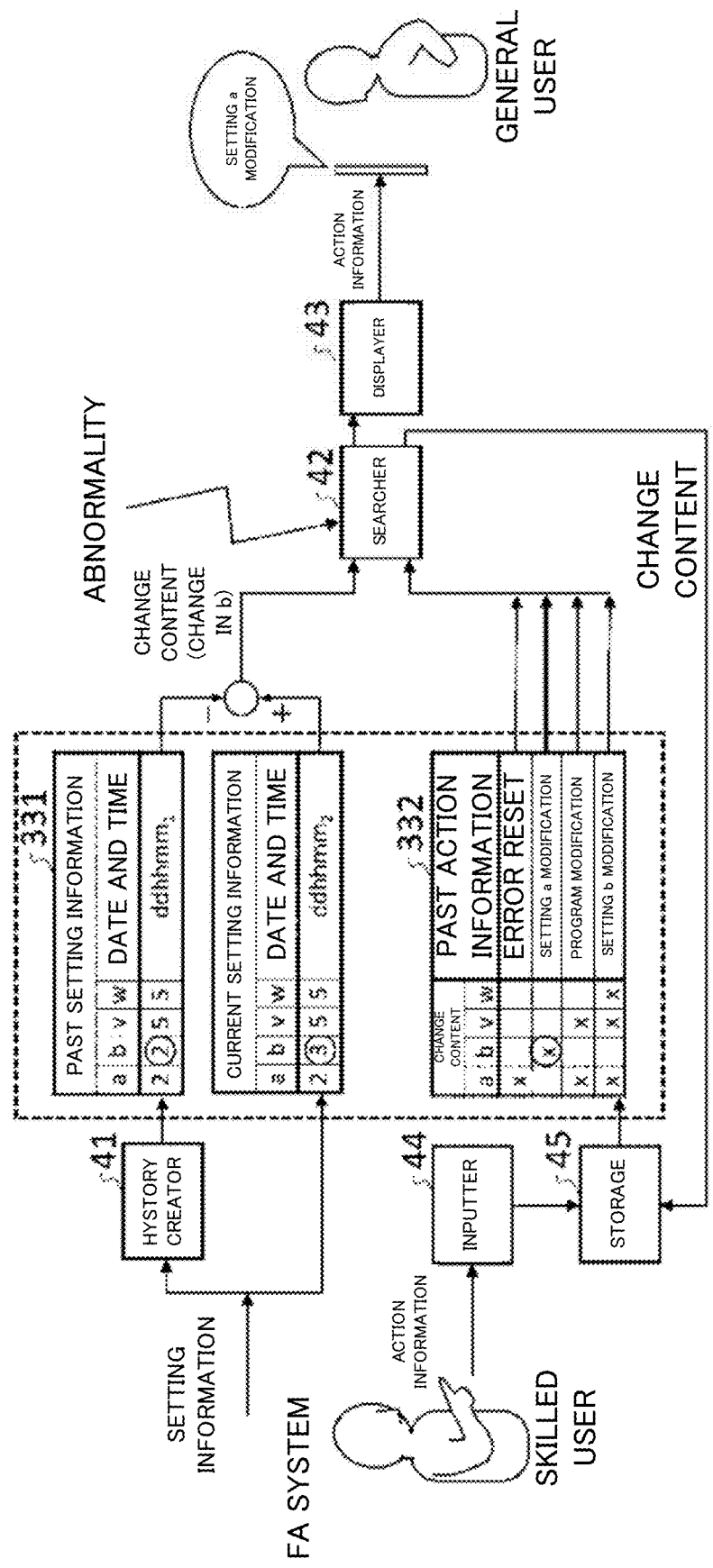
FIG. 2 is an illustrative diagram for describing an outline of a system construction assistance device in Embodiment 1.

FIG. 2 is a diagram for describing an operation outline of the computer 1 of the present embodiment. A history creator 41 that creates backup of the setting information, a searcher 42 that analyzes the setting information in a case of occurrence of an abnormality and searches for proper action information based on a result of the analysis, and a displayer 43 that displays on a display device 16 the action information searched for by the searcher 42 are software modules of the system construction assistance program executed by the computer 1. These modules can cause the computer 1 to promptly provide the user with the action information against the abnormality. Also, the system construction assistance program further includes an inputter 44 and a storage 45 that stores in a storage device 14 the action information input by the inputter 44, and is configured to record past action information input by another user.

First, an outline of operation is described. Since the operation details and other variations of the present embodiment are described following the description of the outline with reference to FIG. 2, one example of the operation is described briefly here.

The history creator 41 receives the setting information of each device 3a and 3b via a reception device 17. The received setting information includes, for example, a pre-processing parameter of the device 3a, that is, a value of the setting a and/or a value of the version v of the pre-processing program, and a finish processing parameter of the device 3b, that is, a value of the setting b and/or a value of the version w of the finish processing program. Then the history creator 41 records the received setting information as the past setting information in a history data file 331, that is, creates a history of the setting information. This history is created periodically or non-periodically.

Upon occurrence of an abnormality, the searcher 42 compares the past setting information of the history data file 331 with the current setting information and extracts a difference between the information as change content. In this example, the current setting has a change in the setting b in comparison with the pre-abnormality settings. The searcher 42 searches, using this change content as a search condition, for action information that matches or is similar to the search condition from among a plurality of pieces of past action information. The past action information is stored in an action information data file 332, and a plurality of pairs of past change contents and the pieces of past action information are recorded in the action information data file 332. In FIG. 2, "×" indicates a setting with a change made, and a blank indicates a setting without change. In this example, error reset, setting a modification, program modification, setting b modification, and the like are stored as the past action information. The searcher 42 extracts, from among these pieces of action information, action information that satisfies the aforementioned search condition, that is, the condition that is the change of the setting b, and outputs the search result to the displayer 43. The displayer 43 displays this action information in the display device 16 and presents the action information to the user.

This operation enables the user to promptly know what the user does is to change the setting a as an action against the abnormality.

The action information data file 332 is a file storing the past action information and is created by the storage 45. For example, a case is a failure to search for proper action information by the searcher 42 in the past occurrence of an abnormality. In such a case, the storage 45 receives from the inputter 44 the action information and from the searcher 42 the information of the change content used in the failed search, adds these pieces of information as a set to the action information data file 332. The action information is information input by the user and read by the inputter 44 from the input device 15 of the computer 1. For example, when an abnormality occurs, a skilled person may find out a cause of, and a proper action against, the abnormality and may input the result. Although this might take time for taking an action upon first-time occurrence of the abnormality, the time necessary for taking the action in the second-and-subsequent-time occurrence can be shortened. As another advantage, in the second-and-subsequent-time occurrence of the abnormality, the abnormality might be addressed by a person who is not even a skilled worker or a worker having a high level of knowledge.

Although the aforementioned description focuses on the setting information for brevity, for example, information from a sensor, that is, state information of production may be recorded as the change content in the past action information to enable an action to be taken in accordance with the state. Also, an action for a program version change can be taken, or an action other than the setting-information-related information, such as an action for sensor replacement, can be presented as the action information.

Details of System Construction Assistance Device

The system construction assistance device of the present embodiment is hereinafter described in detail. Details of the computer 1 are first described and the operation thereof is next described for each software module described in the aforementioned outline of the system construction assistance device. The operation is described in the order of an operation of the history creator 41, an operation of the searcher 42, an operation of the displayer 43, and an operation of the inputter 44 and the storage 45.

Figure 3:
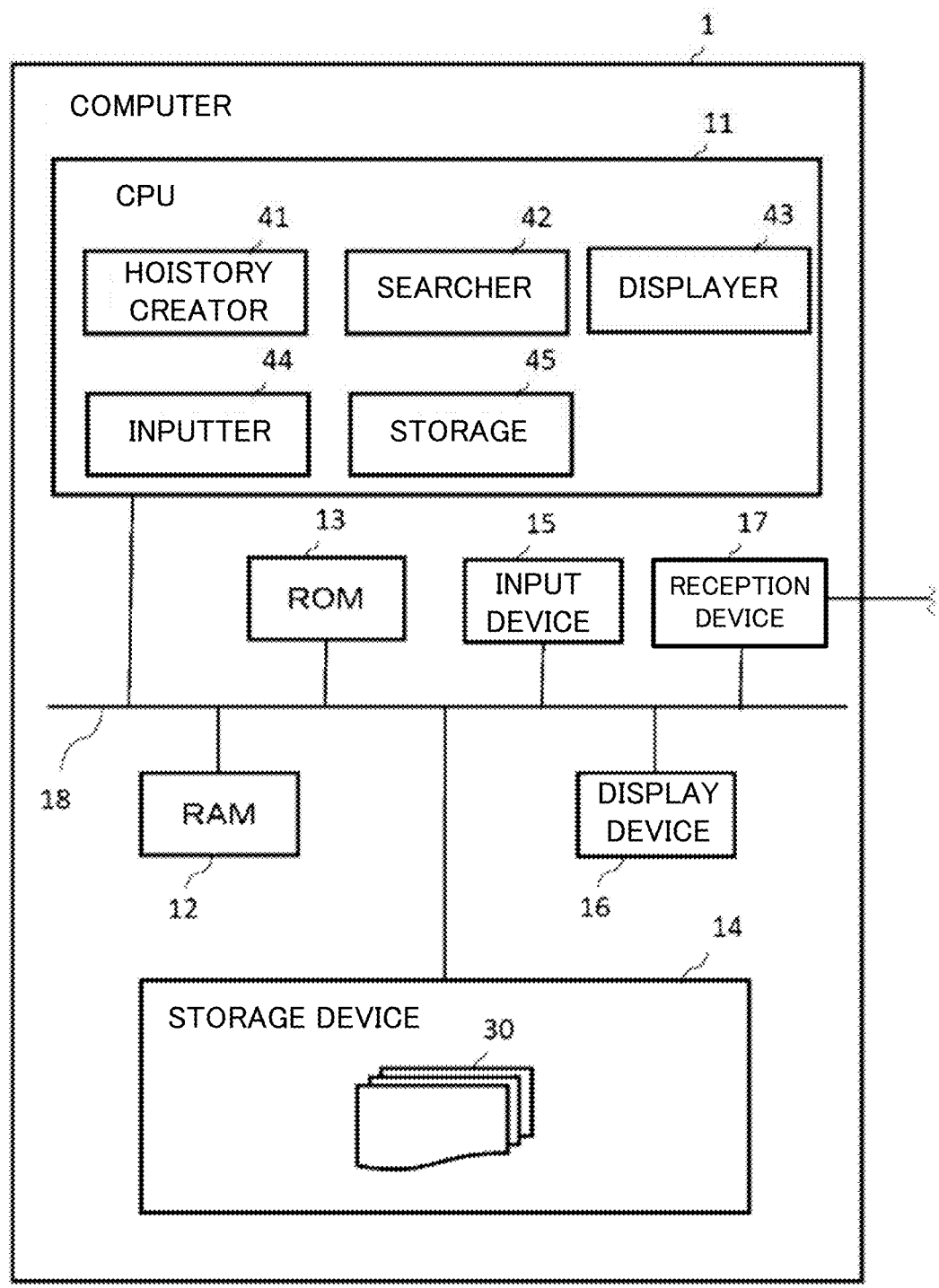
FIG. 3 is a diagram illustrating a hardware configuration of a computer in Embodiment 1.

Firstly, configuration of the computer 1, which is the system construction device, is described with reference to FIG. 3. The computer 1 executes an application program in an operation system (OS), and includes a central processing unit (CPU) 11, a random access memory (RAM) 12, a read only memory (ROM) 13, the storage device 14, such as a hard disk, the input device 15, the display device 16, and the reception device 17. The CPU 11, the RAM 12, the ROM 13, the storage device 14, the input device 15, the display device 16, and the reception device 17 are connected to one another via an internal bus 18.

The CPU 11 is an execution processing device that executes a program stored in the ROM 13 and the storage device 14 while using the RAM 12 as a work area. In the present embodiment, the OS and a construction assistance program 30 are stored in the storage device 14. As described in the aforementioned outline, the construction assistance program 30 includes software modules corresponding to the history creator 41, the searcher 42, the displayer 43, the inputter 44, and a storage 45, and these modules are executed by CPU 11. The construction assistance program 30 includes the history data file 331, the action information data file 332, and data necessary for execution of the program.

Next, an operation of the present embodiment that is a system construction assistance method is described in detail for each component with reference to FIGS. 4 to 16.

Operation of History Creator 41

Figure 4:
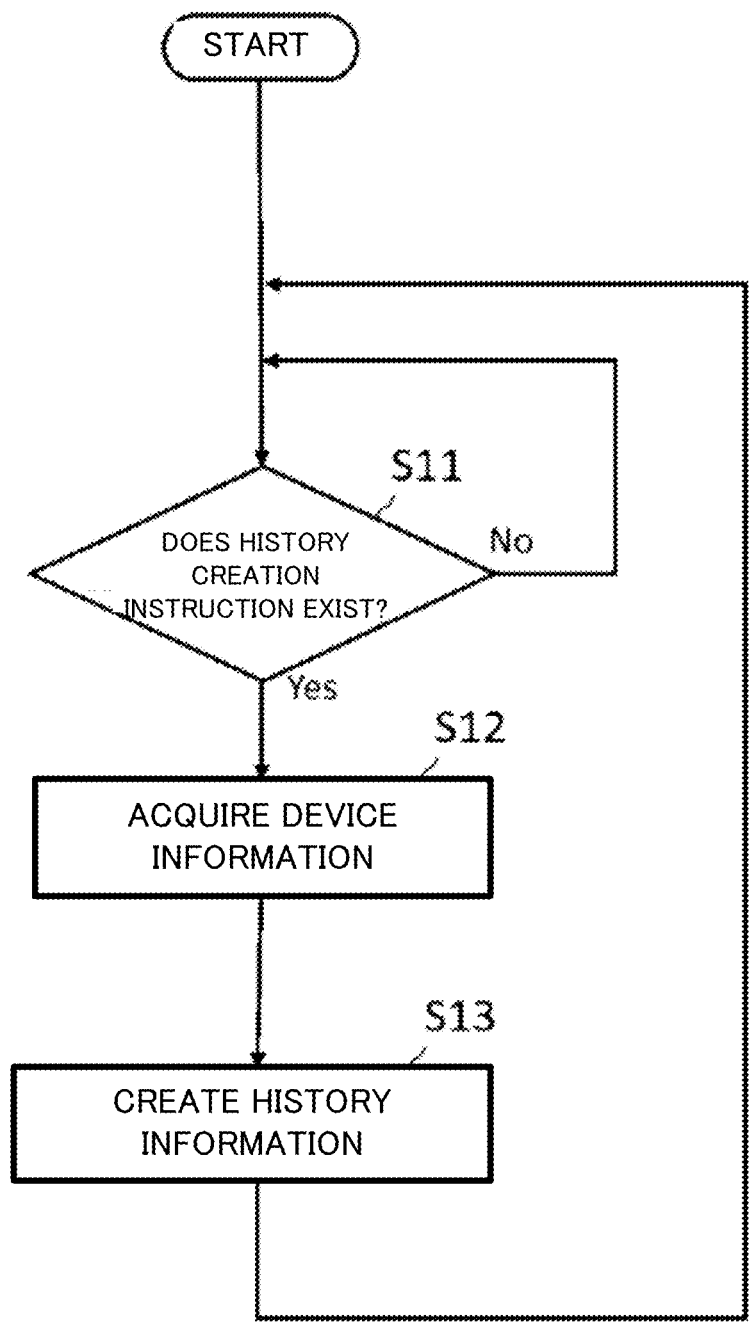
FIG. 4 is a flowchart illustrating a history creating process executed by the computer in Embodiment 1.

FIG. 4 is a flowchart illustrating a history creation process by the history creator 41. In step S11, the history creator 41 determines a timing of history creation. Although the aforementioned outline describes only a history at one point in time, specifically, the history creator 41 stores, in the RAM 12, histories taken at plurality points in time so that a changed point can be traced back in the past. As for the history creation, since a too high frequency of history creation may consume a storage capacity unnecessarily, the history creator 41 performs adjustment to create a history at a proper timing in step S11. Specifically, the history creator 41 determines whether or not a history creation instruction exists in the RAM 12. This instruction is provided manually in accordance with an operation of the input device 15 or temporarily stored in the RAM 12 at a regular interval by a preset timer or at occurrence of an abnormality. In a case where the history creation instruction does not exist, the history creator 41 repeats step S11. In a case where the history creation instruction exists, the history creator 41 deletes the history creation instruction in the RAM 12 and proceeds with the processing to go to step S12.

In step S12, the history creator 41 acquires the device information including the setting information of the production device. Specifically, the history creator 41 outputs an output instruction of the device information via the reception device 17 to the PLC 2. The PLC 2 constantly collects the device information such as the setting information of the device 3 connected to the PLC 2 and stores the collected information in an internal storage device. Upon receiving the aforementioned output instruction from the computer 1, the PLC 2 outputs the latest device information stored therein. The history creator 41 stores in the RAM 12 the device information received via the reception device 17. In the present embodiment, the history creator 41 acquires, from the PLC 2 as the device information, both of the state information indicating the state of the production device and the setting information indicating the setting of the production device.

FIG. 5 is a diagram illustrating the device information to be stored by the history creator 41 in the storage device 14. In the device information is stored, as the aforementioned state information, production piece count information 331b per second, and the setting information such as setting a information 331c of the device A in association with the state information. The device information in rows of FIG. 5 includes information pieces at points in time, and the information pieces are stored in a time series.

Here, the state information is, for example, a production piece count per second of a product in the past 5 seconds in the FA system. The production piece count per second is information of a moving average of the production piece count obtained by dividing the production piece count in the past 10 seconds by 10.

The PLC 2 calculates the moving average of the production piece count per second from the information of the device 3 and stores the calculated moving average every second. In a case of storing the production piece counts per second in the past 5 seconds, the production piece count information 331b is represented by five numbers as in FIG. 5.

As another example of the state information, for example, production total count change and information of presence or absence of abnormality occurrence information output by the sensor 3d may be stored. The production total count change is information that is a change of a production total count from startup of the PLC 2 to the present stored every 10 minutes.

In the outline description, the operation involved in a change of the processing setting by the device 3 is described. In the detailed description here, as indicated in FIG. 5, a case is described where the version v of the software installed in the device 3b in addition to the setting a of the device 3a changes. The setting a is one of parameters input directly to the device 3a or the like, and is set in accordance with the other parameters, a purpose for using the device 3a, or the like.

Although FIG. 5 describes only two types of setting information, setting information of another device 3 and/or another PLC 2 can be, of course, stored in addition to these types of information.

Next, in step S13, which is a history creation step, the history creator 41 creates the history information. Specifically, the history creator 41 outputs to the storage device 14 the device information temporarily stored in the RAM 12 in step S12 and stores the device information in the history data file 331 of the storage device 14.

Here, the information stored in the history data file 331 is described with reference to FIG. 5. The history data file 331 is a database in which the history information that is the past device information is stored, and the state information such as the production piece count and the setting information such as parameters of the device 3 are stored on in chronological order. The history number 331a is a serial number that counts up in chronological order.

The history number 331a, 001 to 003, is stored in the history data file 331 indicated in FIG. 5. FIG. 5 indicates information of the state where production is performed stably without change in the setting, and three pieces of history information stored are all the same information. The description of the production piece count information 331b, (3, 3, 3, 3, 3) represents that the production piece count per second in the past five seconds from when the acquirer 411 acquires the device information in step S12 is always 3. The number "20" of the setting a information 331c indicates that the setting a of the device 3a when the acquirer 411 acquires the device information in step S13 is 20, and the description "ver. 4" of the software w information 331d indicates that the version of the software of the device 3b when the acquirer 411 acquires the device information in step S12 is "4".

According to the above process, the computer 1 can store as the history the device information including the setting information that is information at a time when the history creation instruction exists. The stored device information is collected periodically or non-periodically and added to the history data file 331. Since use of the history data file 331 enables the computer 1 to specify the pre-occurrence-of-abnormality setting and/or state backward in time, the computer 1 can find a cause or specify an action method even when the abnormality occurs suddenly.

Operation of Searcher 42

Next, details of operation of the searcher 42 are described.

Figure 6:
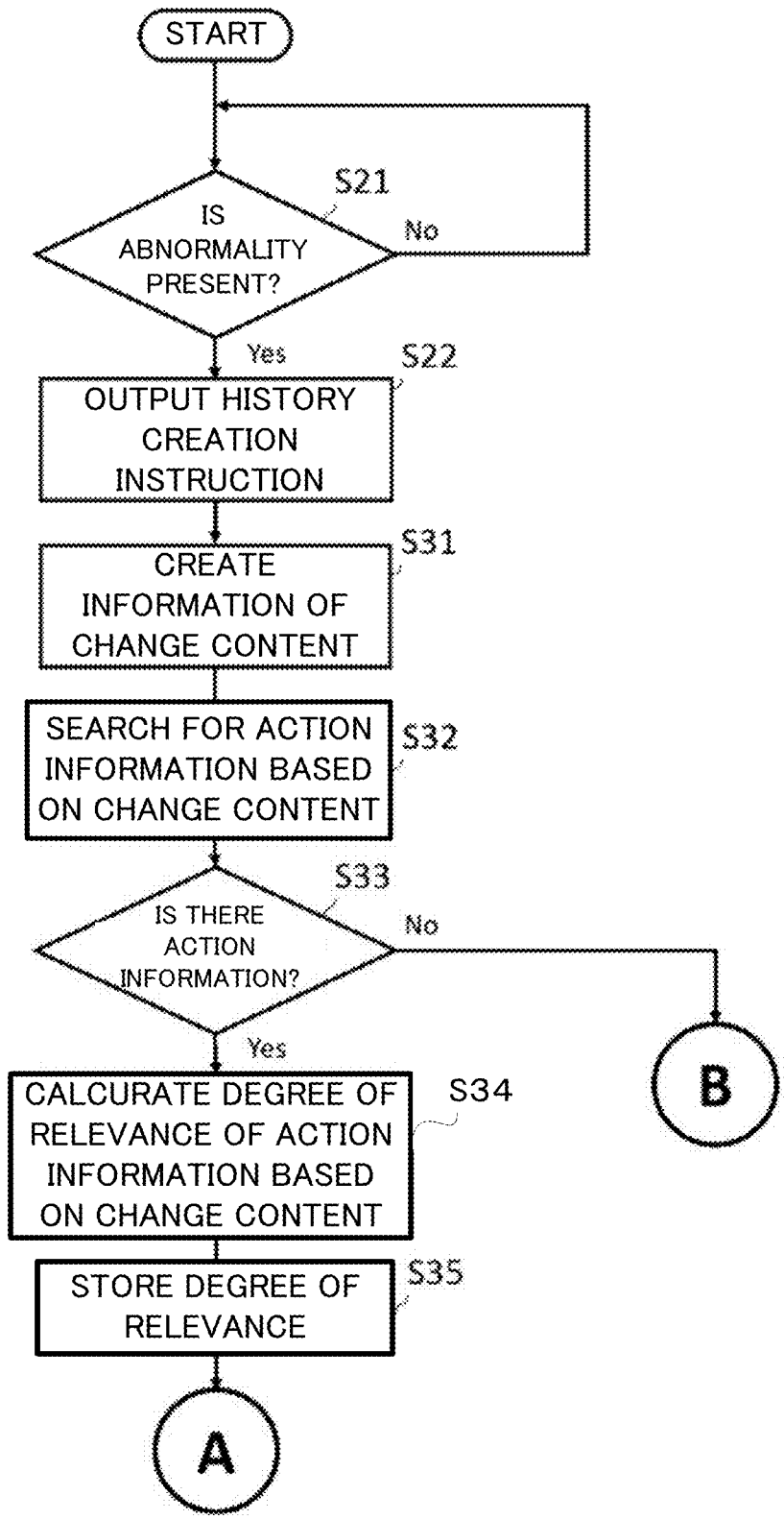
FIG. 6 is a flowchart illustrating an action information searching process executed by the computer in Embodiment 1.

FIG. 6 is a flowchart illustrating a search process of the action information by the searcher 42. First, in step S21, the searcher 42 determines presence or absence of an abnormality occurring in the production device.

Specifically, the searcher 42 transmits an output instruction of the abnormality occurrence information via the reception device 17 to the PLC 2. Upon receiving this output instruction, PLC 2 replies to the reception device 17 as to the presence or absence of the latest abnormality occurrence information. This abnormality occurrence information is determined by the sensor 3*d*. The searcher 42 temporarily stores in the RAM 12 the presence or absence of the abnormality occurrence information input via the reception device 17. Then the searcher 42 determines that the abnormality occurs in the production device in a case where the abnormality occurrence information is present.

The sensor 3*d* is a laser sensor that irradiates a product produced by the FA system with laser light and detects positional information of the product based on an amount of received light and laser reflection time. The sensor 3*d* irradiates the product passing on a belt conveyor with laser light and determines whether the product is produced at a preset time interval. Upon detecting an abnormality, the sensor 3*d* outputs the abnormality occurrence information to the PLC 2. Then the PLC 2 stores the abnormality occurrence information.

The abnormality of the production device is, for example, an abnormality of causing delay in producing products for some reasons, an abnormality in a product shape, an abnormality of a sensor such as soiled light emitting and receiving portions of the sensor 3*d*, or the like.

In step S21, upon determining that an abnormality is not present, the searcher 42 repeats step S21, and upon determining that the abnormality is present, the searcher 42 proceeds with the processing to go to step S22. In step S22, the searcher 42 outputs the history creation instruction to the RAM 12 and stores the instruction in the RAM 12. The history creation instruction is an instruction for the history creator 41, and in a case where this instruction is stored, the history creator 41 creates the history as in the aforementioned process of FIG. 4.

Next, in step S31, the searcher 42 creates information of the change content of the device information accompanying occurrence of the abnormality. Specifically, the searcher 42 reads, from the storage device 14, the latest history information stored in the history data file 331 and the history information having a history number 331*a* immediately before that of the latest history information, and stores a combination of both history information in the RAM 12 as the change content. The latest history information is history information created after occurrence of the abnormality by the history creator 41 based on the history creation instruction output by the searcher 42 in step S22. The history information having the history number 331*a* immediately before that of the latest history information is history information before the occurrence of the abnormality.

The searcher 42 creates information of the change content of the device information accompanying the occurrence of the abnormality by combining these two pieces of history information together for each of the associated pieces of device information stored in the same column. The term "information of the change content" in the following description means "information of the change content of the device information accompanying the occurrence of the abnormality" unless otherwise described. The information of the change content may be in any form that allows specification of the change content. For example, the information of the change content may be a combination of pieces of history information at two different points in time as in this detailed description or may be difference information of two points in time as in the outline description. Also, the information of the change content may be data of specific settings or more abstract data indicating that a certain value has changed. In general, although the more specific information of the change content provides a higher accuracy of specifying and detecting action information, the action method would be hard to find in a case of occurrence of a similar abnormality. By contrast, although the more abstract information of the change content provides a lower accuracy of the action information, the action method for the similar abnormality is likely to be extracted.

Subsequently, in step S32 that is the search step, the searcher 42 searches for the action information indicating the action against the abnormality, using as the search condition the change content accompanying the occurrence of the abnormality. This search is performed for the action information data file 332 stored in the storage device 14. As illustrated in FIG. 7, the action information data file 332 is a data file recording the change content information 332*b* at the past abnormality occurrence and the action information 332*c* for the abnormality. The searcher 42 compares the information of the change content created in step S31 with the change content information 332*b* of the action information data file 332. When there is even only one matched change of the device information, the action information 332*c* associated with the change content information 332*b* including the matched change of the device information, other information 332*d*, and addressability information 332*e* are temporarily stored in the RAM 12 together with the change content information 332*b*. This search enables extraction of one or more candidates of proper actions against the currently occurring abnormality.

Here, the action information data file 332 is described with reference to FIG. 7. The action information data file 332 includes an action number 332*a*, which is a serial number, the change content information 332*b*, the action information 332*c*, the other information 332*d*, and the addressability information 332*e*. The action information data file 332 is a database where the action information 332*c* that is the action information stored in the past occurrence of an abnormality and the change content information 332*b* that is information indicating a change of the device information accompanying the occurrence of the abnormality when the action is performed are stored in association with each other. Storing of the action information data file 332 is described later with reference to FIG. 16.

The change of the device information accompanying the past occurrence of the abnormality is stored for each device information in the change content information 332*b*. The action information 332*c* includes the cause of the abnormality and the action method. The other information 332*d* includes the action day and a remark.

The addressability information 332*e* includes information on whether or not the action indicated by the action information 332*c* is executable by the user. The action executable by the user in the present disclosure is an action predefined as being executable. Being executable by the user is being executable by a person who uses the production device daily. For example, replacement of parts corresponds to the action. By contrast, the action not executable is an action usually performed by a maintenance worker, such as parameter adjustment of the device 3.

A detailed example of each information 332*b* to 332*e* is described using data with the action number 332*a* being 001 in FIG. 7. The change content information 332*b* represents a case where the production piece count per second before occurrence of the abnormality is 3, but the production piece count per second after occurrence of the abnormality decreases to 1. This also shows that the number of the setting a before occurrence of the abnormality of the change content information 332*b* is 20 but the number of the setting a after occurrence of the abnormality changes to 10. By contrast, this also shows that the version v of software is 4 and remains unchanged. The action information 332c indicates that the number of the setting a being improper is a cause of the abnormality and the action method thereof is to adjust the setting a. The other information 332d indicates that the action day when the action is previously performed is Dec. 10, 2015, and there are no comments in the remark. The addressability information 332e indicates that this action is not executable by the user.

After search of the action information, the searcher 42 determines whether there is action information extracted by the search in step S33. Specifically, when there is even only one piece of action information 332c stored in the RAM 12 based on the search, the searcher 42 executes processing of calculating a degree of relevance for the action information extracted in step S34.

Step S34 is a calculation step and, specifically, the following processing is performed. The searcher 42 calculates a degree of relevance of the current abnormality with the past action information extracted by the search in step S32. For example, the searcher 42 calculates a degree of match in percentage between the information of the change content for the current abnormality created in step S31 and the change content information 332b corresponding to each piece of action information 332c extracted in step S32. Here, as illustrated in FIG. 7, in a case where three items of change content are associated for single action information, the degree of relevance with three matches is calculated to be 100% and the degree of relevance with one match is calculated to be 33%. Determination as to matching or non-matching is performed between the same devices and between the same settings.

The high degree of relevance means a high possibility that the cause of the current abnormality is the same as the cause of the abnormality having occurred in the past. That is, this means there is a high possibility that the action information 332c stored in association with the change content information 332b is proper as an action against the current abnormality. In a case of a plurality of pieces of extracted action information in the previous step, this degree of relevance is calculated for each piece of action information.

In step S35, the searcher 42 stores, in the RAM 12, the degree of relevance calculated in step S34 and the action information 332c in association with each other. By contrast, in step S33, in a case where determination is made that there is no action information searched for, the processing of receiving an input of new action information is executed. This processing is described later with reference to FIGS. 9 and 11.

The above processing enables the computer 1 to search, in a case of occurrence of an abnormality in the production device, for the action information for the abnormality. Also, a degree of relevance of the abnormality occurring with the action information for the abnormality can be calculated.

Operation of Displayer 43

Figure 8:
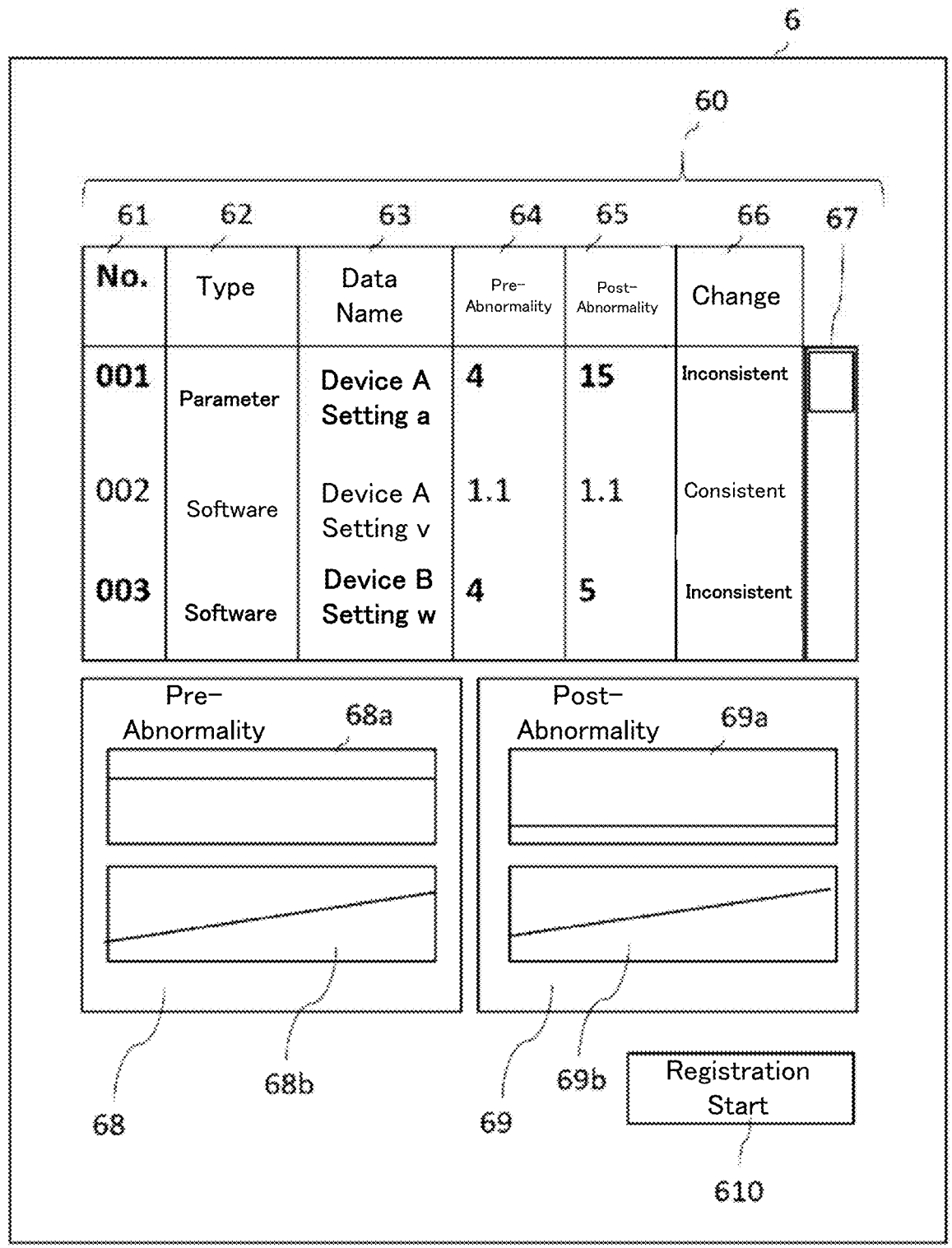
FIG. 8 is a diagram illustrating an example of a change content display screen in Embodiment 1.

Next, an operation of the displayer 43 is described with reference to FIGS. 8 to 15. FIG. 8 illustrates a change content display screen 6 displayed on the display device 16 by the displayer 43. The change content display screen 6 is a screen for displaying information of the change content created by the searcher 42 in step S31 of FIG. 6, and includes a device information display 60, a pre-abnormality waveform data display 68, a post-abnormality waveform data display 69, and a registration start button 610. The registration start button 610 is a button to be pressed by operation using the input device 15.

Figure 9:
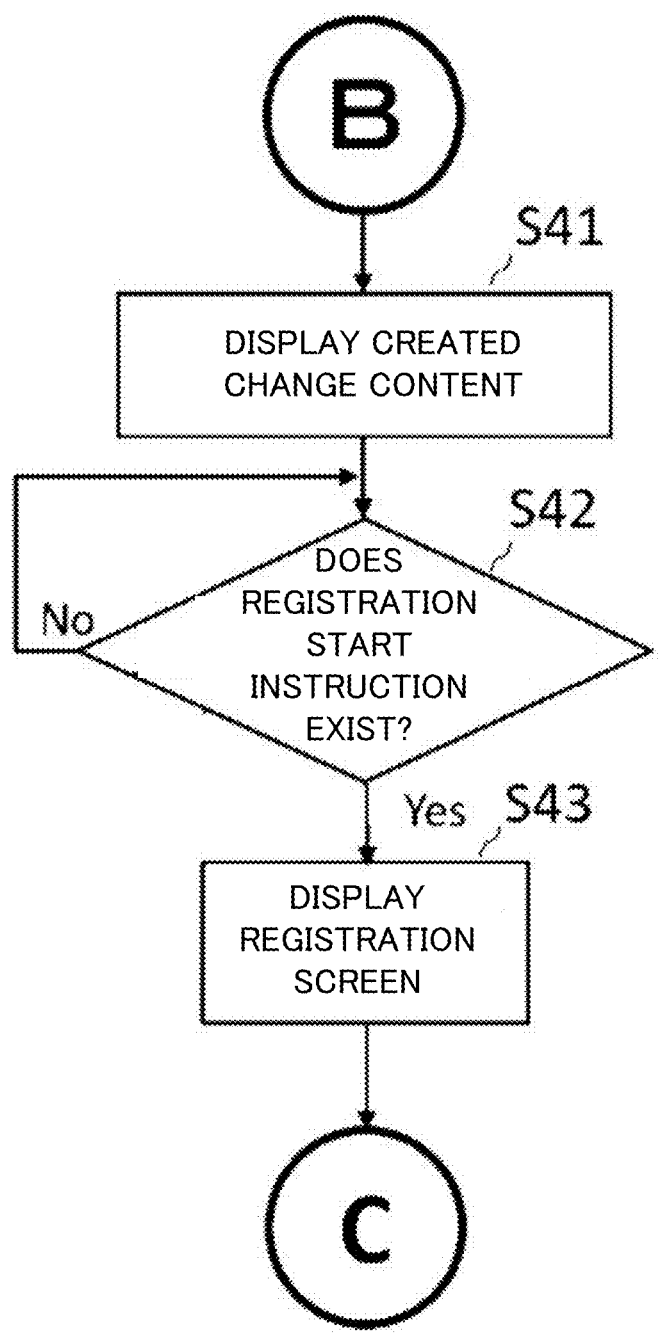
FIG. 9 is a flowchart illustrating a registration screen display process executed by the computer in Embodiment 1.
Figure 10:
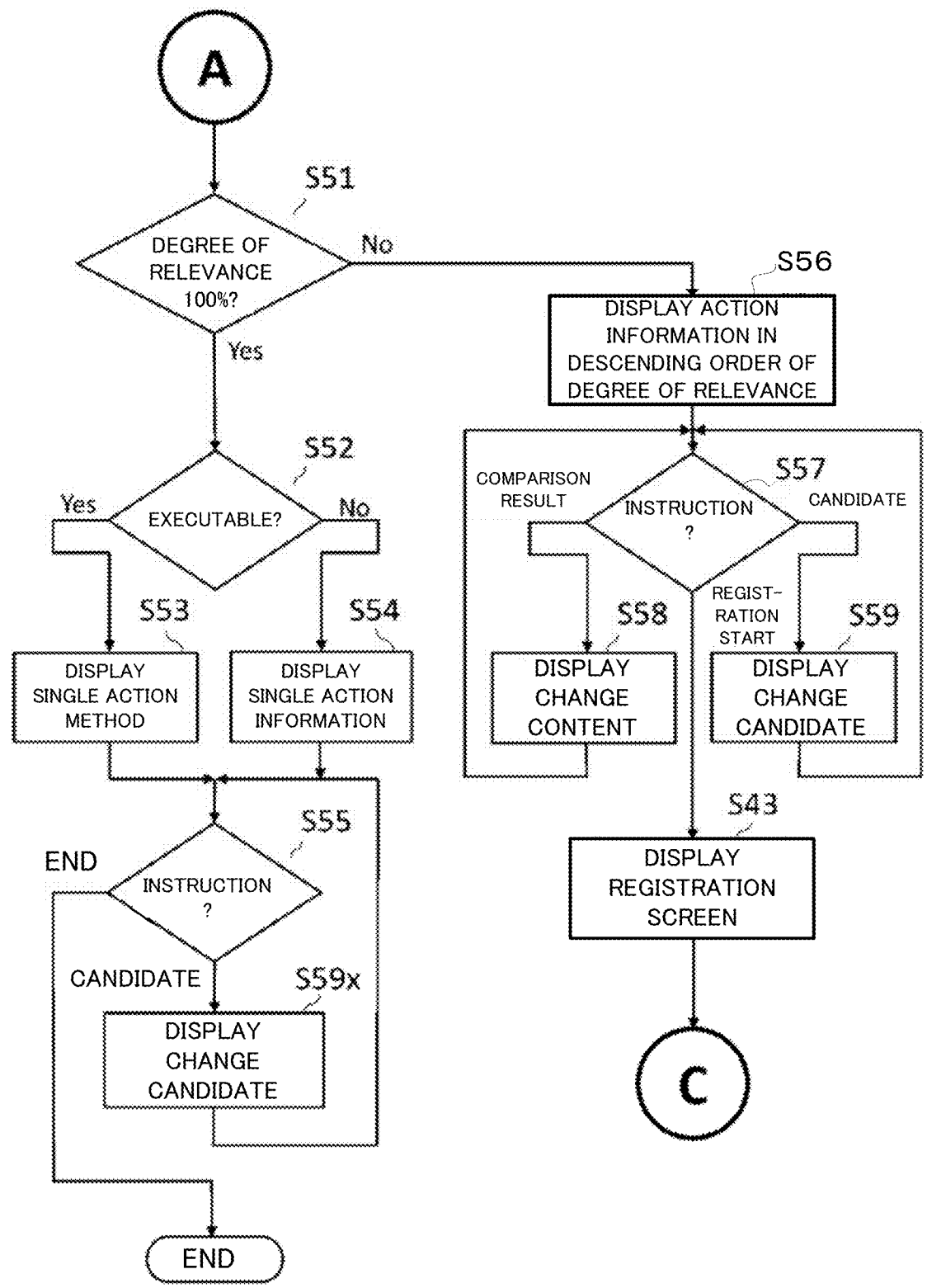
FIG. 10 is a flowchart illustrating an action information displaying process executed by the computer in Embodiment 1.

FIGS. 9 and 10 are flowcharts illustrating a display process by the displayer 43. FIG. 9 illustrates the change content display screen 6 displayed when the action information is newly registered and the display process of the registration screen of FIG. 11. FIG. 10 illustrates a display process performed when information such as the action information is provided to the user. First, the display process of FIG. 9 is described. Step S41 illustrated in FIG. 9 is processing performed in a case where determination is made that there is no action information in step S33 of FIG. 6 as described above. In a case where the action information for the abnormality is not extracted in the searcher 42, addition of new action information is needed. Thus, in order for the user to easily analyze the cause of the abnormality, the change content is displayed in an easy way to understand so that the user is prompted to enter the result of the action. Step S41 of FIG. 9 is processing that displays the change content. The displayer 43 creates the change content display screen 6 based on the information of the change content created by the searcher 42 and format data of an image, and displays the change content display screen 6 on the display device 16. The format data uses data stored in construction assistance program 30. Although the data may be any format of data that can create a display image, bitmap data and coordinate data of a text insertion area, and data of description language, such as Hyper Text Markup Language (HTML) or Cascading Style Sheet (CSS), or the like can be used. As a display engine, a display library used in a known programming language, a display engine for HTML, or the like can be used.

As illustrated in FIG. 8, the device information display 60 includes a data number 61 that is a serial number, a type name display 62, a data name display 63, a pre-abnormality display 64, a post-abnormality display 65, a change display 66, and a scrollbar 67. The type name display 62, the data name display 63, the pre-abnormality display 64, the post-abnormality display 65, and the change display 66 are associated with the data number 61, and displayed alongside of the associated data number 61. The data number 61 is given to all the device information of the history information used for creating the information of the change content in step S31.

The type name display 62 and the data name display 63 are for displaying names of the device information to be displayed, and correspond to types of the history information used for creating the information of the change content in step S31. The type name display 62 and the data name display 63 whose data number 61 is 001 correspond to the setting a information 331c of the history data file 331. The display "parameter" of the type name display 62 indicates that the corresponding setting a information 331c is the device information classified as the parameter. The display "device A setting a" of the data name display 63 indicates that the display is the device information about the setting a of the device 3a together with the type name display 62.

The pre-abnormality display 64 and the post-abnormality display 65 indicate the device information accompanying occurrence of the abnormality, such as the pre-abnormality setting and the post-abnormality setting, respectively. The displays "4" and "15" of the pre-abnormality display 64 and the post-abnormality display 65 whose data number 61 is 001 indicates that the number of the setting a of the device 3a accompanying occurrence of the abnormality changes from 4 to 15. The change display 66 indicates whether or not the pre-abnormality display 64 is consistent with the post-abnormality display 65. Also, since the device information with the change display 66 that is inconsistent is the changed device information, the display is emphasized in bold for easy visualization of the display. By these displays, the user can know changed portions of the setting and the content thereof and use the content to determine the cause of the abnormality.

The pre-abnormality waveform data display 68 is a graph indicating production situations sensed by a sensor 3d or the like and/or an operation condition of the device, and is, for example, display including a pre-abnormality production piece count waveform 68a and a pre-abnormality production total count waveform 68b relating to the production piece count. Similarly, the post-abnormality waveform data display 69 is display including the post-abnormality production piece count waveform 69a and a post-abnormality production total count waveform 69b. These displays are graphs having a horizontal axis indicating time and a vertical axis indicating a piece count. The pre-abnormality production piece count waveform 68a and the post-abnormality production piece count waveform 69a indicate as graphs the information corresponding to the production piece count information 331b of the history data file 331 before and after occurrence of the abnormality, respectively. The pre-abnormality production total count waveform 68b and the post-abnormality production total count waveform 69b indicate as graphs the information corresponding to the device information of the production total count change of the history data file 331 not illustrated in FIG. 7, before and after occurrence of the abnormality, respectively. By these displays, the user can determine whether the production piece count changes before and after occurrence of the abnormality. In this example, the user can know of a situation where the production piece count decreases as abnormality.

Next, in step S42, the displayer 43 determines whether a registration start instruction exists. Specifically, the displayer 43 determines whether the registration start button 610 is pressed. This determination can be made using known graphical user interface techniques using a touch sensor, a mouse, and/or a keyboard. For example, in a case where coordinates of a virtual button using an image of button is specified by the user, processing associated with an event may be invoked using an interface library such as occurrence of the event. In a case where the registration start button 610 is not pressed, processing of step S42 is repeated.

In a case where the registration start button 610 is pressed, in step S43, the displayer 43 displays the registration screen 7 of the action information illustrated in FIG. 11 and causes the inputter 44 to perform input processing of the action information. This input processing is described later in an operation of the inputter 44. Basic processing of the display processing described in step S41 and the determination processing of the input in step S42 can also be achieved using similar techniques in another processing of the displayer 43.

Here, the registration screen 7 is described with reference to FIG. 11. The registration screen 7 includes an action method entry field 71, a cause entry field 72, an addressability checkbox 73, a remark entry field 74, and a registration button 75. The action method entry field 71, the cause entry field 72, and the remark entry field 74 are entry field in which characters are entered by operation using the input device 15. The addressability checkbox 73 is a check field in which a check mark is placed by operation using the input device 15. The registration button 75 is a button to be pressed by operation using the input device 15.

In the above description, the display of the change content and the registration of the action information are described in a case where the action information cannot be extracted. Here, display of the action information in a case where the action information is extracted is described with reference to FIG. 10. A terminal A of FIG. 10 is the same as a terminal A of FIG. 6. These terminals A indicate that processing of step S51 is performed after processing of step S35 in FIG. 6.

In step S51, the displayer 43 determines whether or not a degree of relevance of the action information 332c having the highest degree of relevance calculated in step S34 among the action information 332c stored in the RAM 12 in step S32 of FIG. 6 is 100%. The specification of the action information 332c having the highest degree of relevance and the determination as to whether the degree of relevance is 100% are performed with reference to the degree of relevance calculated by the searcher 42.

First, processing in a case where the maximum value of the degree of relevance is 100% is described. A 100% degree of relevance means a probability of overcoming the abnormality with the action information can be considered to be high. Thus the displayer 43 does not display a plurality of extracted pieces of action information but displays only the action information having a 100% degree of relevance to present the action in a display that is simple for the user to easily understand. Since the display has two types of display in accordance with users, these two types of display are described in order.

In step S52, which is a determination step, the displayer 43 determines whether the action indicated by the action information 332c having a 100% degree of relevance is an action executable by the user. That is, the displayer 43 determines whether the action can be addressed by a general user having a low skill level. The determination as to whether the action method is executable by the user is performed with reference to the addressability information 332e stored in accordance with the action information 332c.

Figure 12:
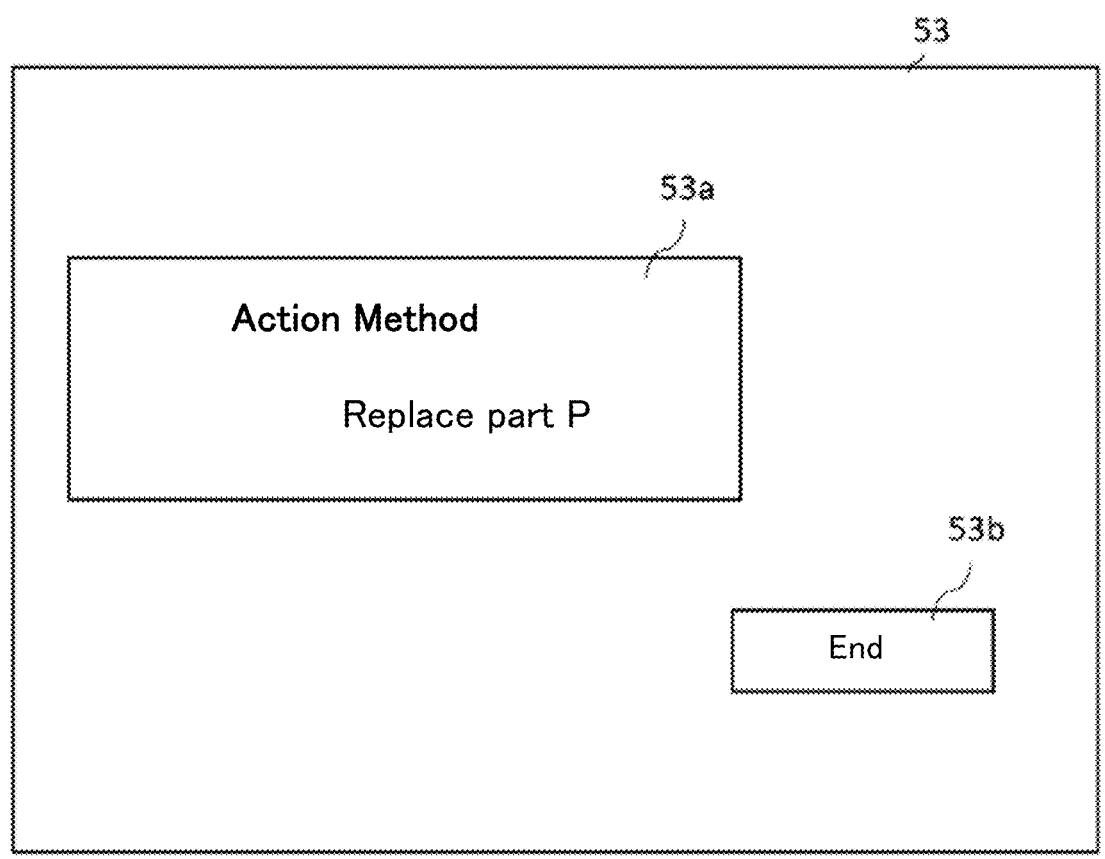
FIG. 12 is a diagram illustrating an example of an action method display screen in Embodiment 1.

In a case where determination is made that the action is executable, the displayer 43 creates, based on the action information 332c, an action method display screen 53 illustrated in FIG. 12 and displays the created screen on the display device 16 in step S53. The action method display screen 53 is for a screen for displaying the action method only briefly, and for notifying the general user of the action method with no need for analysis, importance of the problem being at a low level.

Figure 13:
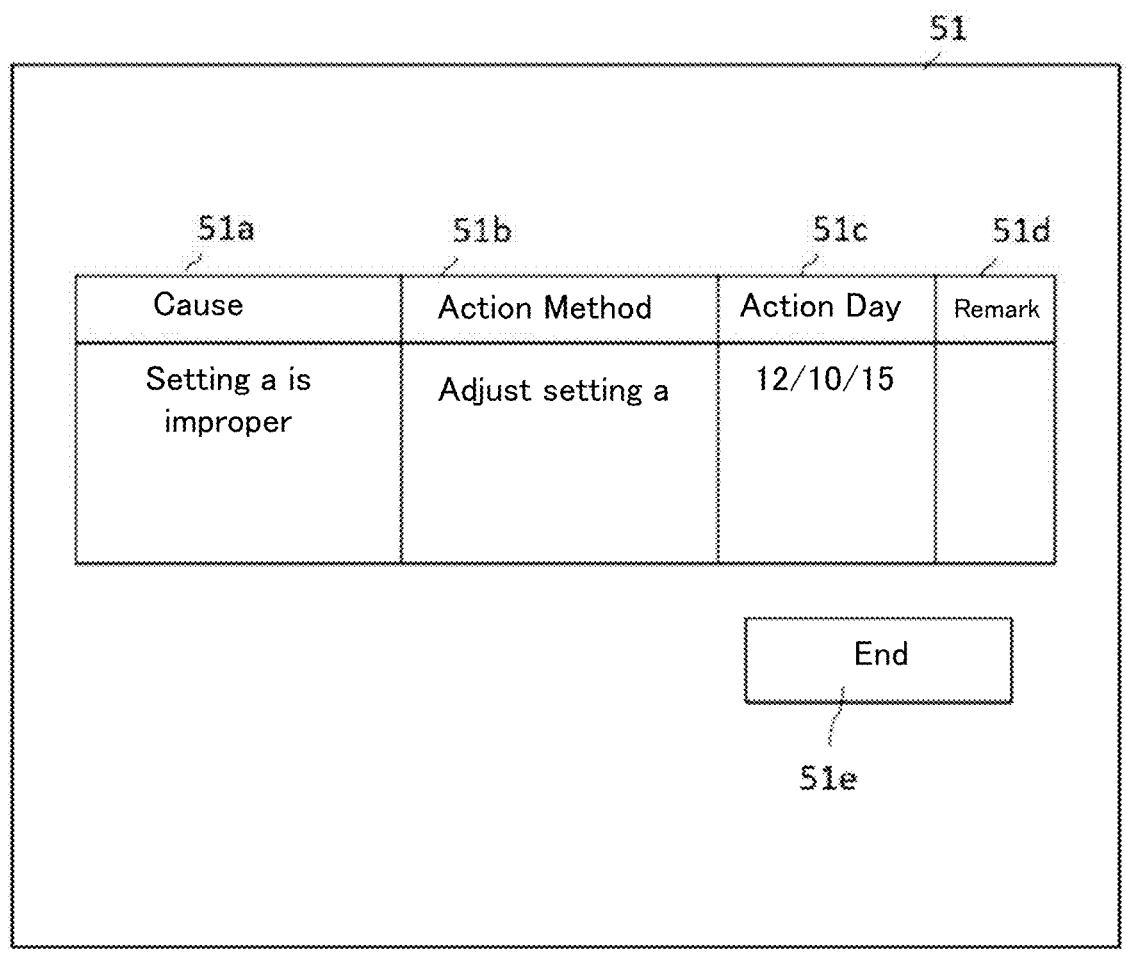
FIG. 13 is a diagram illustrating an example of an action information display screen in Embodiment 1.

In a case where determination is made in step S52 that the action is not executable, the displayer 43 displays on the display device 16 the action information display screen 51 illustrated in FIG. 13. This screen differs from the aforementioned screen of FIG. 12 in that the screen has more display items such as a cause. For example, in a case where the specific content of the action varies depending on the causes and determination by human is necessary, this screen is displayed. Since how to adjust needs determination by human even when adjustment of the setting is displayed as the action method, reference information such as the causes is displayed together with the action method. This display is performed for the action method classified as not executable by the general user, and this display is for a skilled person having a higher level of skill than the general user, for example, for a maintenance worker.

Here, the action method display screen 53 and the action information display screen 51 are described with reference to FIGS. 12 and 13. First, the action method display screen 53 of FIG. 12 is a screen for displaying only one action method of the action information 332c. The action method display screen 53 includes an action method display 53a and an end button 53b.

The action information display screen 51 of FIG. 13 displays one item including the action information 332c and the other information 332d associated with the action information 332c. The action information display screen 51 includes a cause display 51a, an action method display 51b, an action day display 51c, a remark display 51d, and an end button 51e.

The cause display 51a and the action method display 51b are for displaying the cause and the action method included in the action information 332c having a 100% degree of relevance, respectively. Also, the action day display 51c and the remark display 51d are for displaying the action day and the remark included in the other information 332d associated with the action information 332c having a 100% degree of relevance, respectively. The end button 51e is a button to be pressed by operation using the input device 15.

Next, in step S55, the displayer 43 determines whether or not the end buttons 51e and 53b and a candidate link are pressed. The candidate link is similar to a candidate link 52l illustrated in FIG. 14, which is described later, and is displayed in the remark display 51d in a case where the link address is stored in the other information 332d. In a case of the action information display screen 51 illustrated in FIG. 13, the candidate link is not displayed since the other information 332d address of the data is not stored.

With the end buttons 51e and 53b pressed, the displayer 43 deletes the information stored in the RAM 12 and ends the processing. Here, the action information for which determination is made that the degree of relevance is 100% is not added to the action information data file 332. Thus, the number of pieces of action information 332c for which determination is made in step S34 of FIG. 6 that the degree of relevance is 100% is one at a maximum.

With the candidate link pressed, the displayer 43 proceeds with the processing to go to step S59x. Since step S59x is similar processing as step s59 described later, step S59x is described together with step S59.

Next, display of the action information in a case where the level of relevance is not 100% is described. In this case, there is a high probability that the action information having the highest degree of relevance is proper action information among the action information extracted by the searcher 42, but the other action information may be sometimes proper. Thus, the displayer 43 executes processing of displaying the plurality of pieces of action information in order of the degree of relevance. In step S56, the displayer 43 displays the action information list display screen 52 including the plurality of pieces of action information illustrated in FIG. 14. Specifically, the displayer 43 creates the action information list display screen 52 based on the action information 332c and the information associated with the action information 332c stored in the RAM 12 in step S32 of FIG. 6, and displays the created screen on the display device 16.

Figure 14:
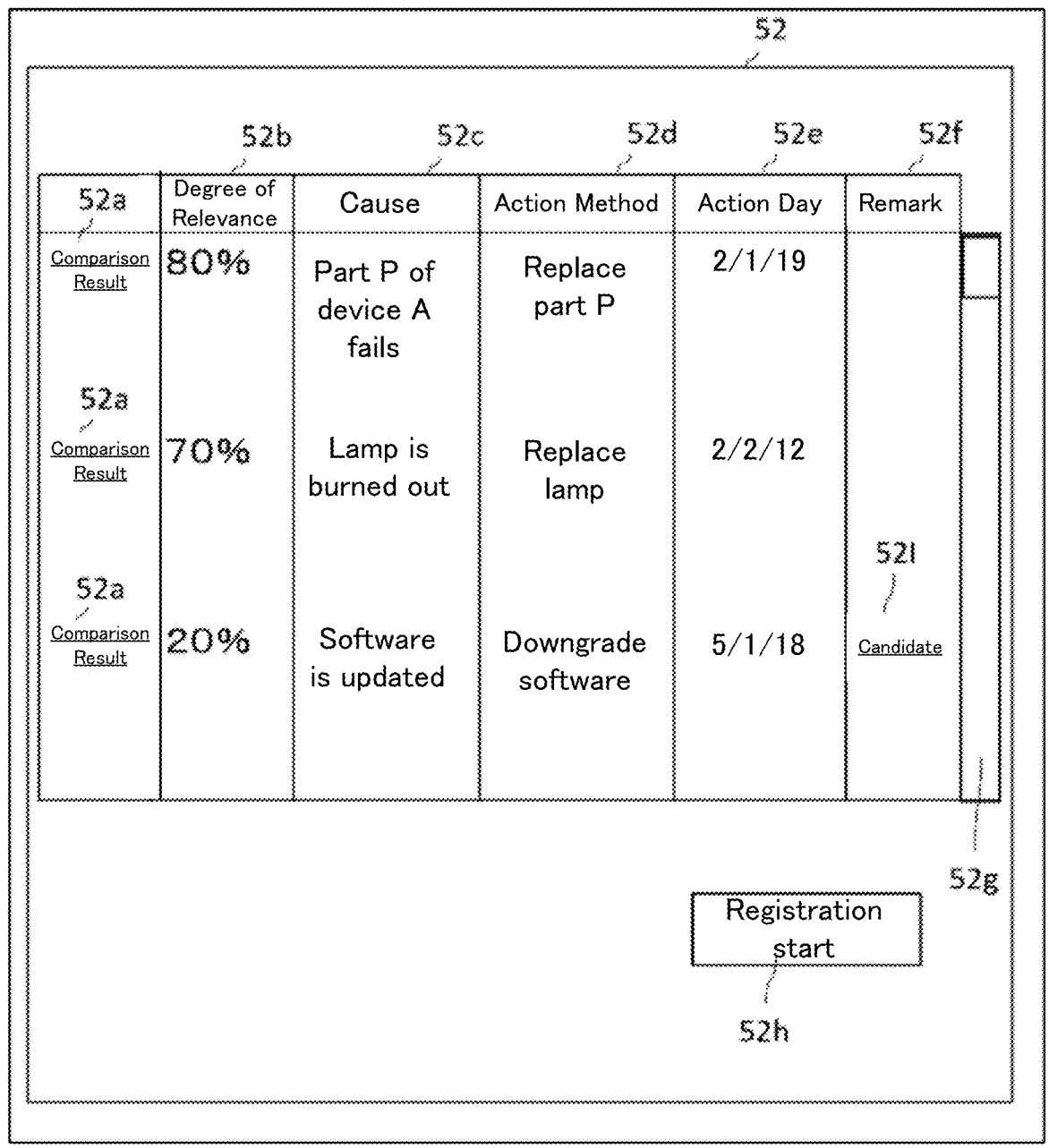
FIG. 14 is a diagram illustrating an example of an action information list display screen in Embodiment 1.

Here, the action information list display screen 52 is described with reference to FIG. 14. The action information list display screen 52 is a screen for displaying the action information 332c and the information associated with the action information 332c searched for by the searcher 42 in descending order of the degree of relevance. The action information list display screen 52 includes a comparison result link 52a, a degree of relevance display 52b, a cause display 52c, an action method display 52d, an action day display 52e, a remark display 52f, a scrollbar 52g, and a registration start button 52h.

The comparison result link 52a, the degree of relevance display 52b, the cause display 52c, the action method display 52d, the action day display 52e, and the remark display 52f are displayed side by side for the associated action information 332c. The comparison result link 52a and the registration start button 52h, and the candidate link 52l described later are buttons to be pressed by operation using the input device 15, and determination as to whether or not the buttons are pressed is made in step S57 described next.

The degree of relevance display 52b is for displaying the degree of relevance calculated by the searcher 42. The cause display 52c and the action method display 52d are for displaying the cause and the action method included in the action information 332c. Also, the action day display 52e and the remark display 52f are for displaying the action day and the remark included in the other information 332d associated with the action information 332c.

The candidate link 52l is a button displayed in the remark display 52f in a case where the version change of software as the cause is stored in the action information 332c and an address of the development history information is stored as a remark included in the other information 332d. Upon pressing of this button, the displayer 43 displays on the display device 16 the change candidate display screen 10 illustrated in FIG. 15. This processing is described later in the description of step S59. The development history information is information about a development history of the software stored in the construction assistance program 30, and is a history indicating which version is the basis for development of a certain version. In FIG. 14, the candidate link 52l is displayed in the remark display 52f in the third item from the top. This means that the development history of the software is stored in the construction assistance program 30 and the address of the development history is stored as the remark of the other information 332d.

In step S57, the displayer 43 determines whether or not the comparison result link 52a, the registration start button 52h, and the candidate link 52l of the action information list display screen 52 are pressed.

With the comparison result link 52a pressed, the displayer 43 displays on the display device 16 a screen for comparing the change content relating to the current abnormality and the change content associated with the past action information in step S58. For example, the displayer 43 creates, based on the information of the change content created by searcher 42 in step S31 of FIG. 6, the change content display screen 6 displaying the information and creates the change content display screen 6 displaying the change content information 332b relating to the past action information searched for by the searcher 42 in step S32 of FIG. 6 similarly, and creates a composite screen displaying both of the screens side-by-side and display the composite screen on the display device 16.

Here, the change content display screen 6 relating to the past action information is a screen for displaying the change content information 332b corresponding to the action information 332c storing the cause display 52c and the action method display 52d displayed alongside the comparison result link 52a pressed in step S57.

In step S57, upon pressing of the candidate link 52l, the displayer 43 executes step S59, which is a candidate display step. That is, the displayer 43 displays the change candidate display screen 10 illustrated in FIG. 15. Specifically, the displayer 43 creates, and displays on the display device 16, the change candidate display screen 10 based on the software version information after occurrence of the abnormality among the information of the change content created in step S31 of FIG. 6 and the development history information specified by the address stored in the other information 332d.

Here, the change candidate display screen 10 is described with reference to FIG. 15. The change candidate display screen 10 is a list of versions having a possibility of causing an abnormality similar to the currently occurring abnormality. Specifically, the development history of the software is displayed in tree view form on the change candidate display screen 10. Also, a version of the software after occurrence of the abnormality is marked with an x-mark and highlighted. The version developed based on such version is also highlighted. The display of this change candidate display screen 10 means that the abnormality occurs due to ver1.1, and the production device in which Ver1.2 and Ver1.3 developed based on Ver1.1 before and after the occurrence of the abnormality are installed has a high probability that a similar abnormality occurs.

In step S59x, which is a candidate display step, the displayer 43 displays the change candidate display screen 10 similarly to step S59, and proceeds with the processing to go to step S55.

In step S57, with the registration start button 610 pressed, the displayer 43 displays on the display device 16 the registration screen 7 illustrated in FIG. 11 in step S43 for the displayer 43 to prompt the user to input new action information. This processing is processing similar to step S43 of FIG. 9. Upon completion of this display processing, the displayer 43 passes the processing to the inputter 44. This input processing is described later with reference to FIG. 16.

In the description above, the operation of the displayer 43 is described. In the description, steps S53, S54, and S56 of FIG. 10 are display steps, in this embodiment, for displaying the action information on the display device 16. Next, input and storage of new action information are described.

Operations of Inputter 44 and Storage 45

Figure 16:
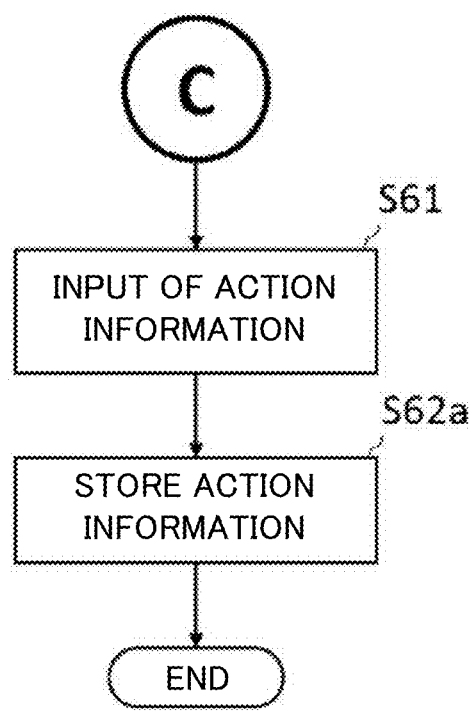
FIG. 16 is a flowchart illustrating an action information storing process executed by the computer in Embodiment 1.

FIG. 16 is a flowchart illustrating a storage process of the action information by the inputter 44 and the storage 45. The terminal C of FIG. 16 is the same as the terminals C of FIGS. 9 and 10. The terminal C indicates that processing of step S61 is performed after processing of step S43 of FIGS. 9 and 10.

In step S61, which is an input step, the inputter 44 receives selection results of text, a checkbox, and various types of buttons input entered by the user using the input device 15, based on an input signal sent from the input device 15. One example of this input receiving process is by a method of achieving the process using an input/output library provided in a program development environment where a graphical user interface using a window is provided. More specifically, the action method entry field 71 is specified as a textbox in which text can be entered and the registration button 75 is specified as a button with the operation specified to cause the displayer 43 to display the entry field and the button as the aforementioned processing of step S43. Then, in the display state, the inputter 44 receive an input using the input/output library. When the user presses the registration button 75 of FIG. 11, an even occurs, and thus each of the modules 41 to 45 of the CPU 11 is caused to execute the processing specified by the event. At this time, the information entered in each of the entry fields 71 to 74 is recorded in the RAM 12 in the form of variables or the like, and is configured to be readable by each module. The method of display and/or entry is not limited to this method, and may be achieved with another known user interface techniques such as a combination of HTML and common gateway interface (CGI).

Upon pressing of the registration button 75, the storage step is executed. In step S62a, the storage 45 stores in the action information data file 332 the information entered in the registration screen 7 in step S61, and the processing ends.

Updating of the action information data file 332 is performed, specifically, by storing new information of the action number 332a, the change content information 332b, the action information 332c, the other information 332d, and the addressability information 332e in association with one another. The storage 45 stores, as the change content information 332b, all of the information of the change content created by the searcher 42 in step S31. Also, the storage 45 stores, as the action information 332c, the text received by the inputter 44 in step S61, that is, information of the text entered in the cause entry field 72 and the action method entry field 71 of FIG. 11. This text information includes the cause and the action method. The other information 332d stores as the action day the current date acquired from the OS. Also, the storage 45 stores, as the remark, the information of characters entered in the remark entry field 74. The address of the development history information described above is entered as text. The addressability information 332e stores the information that the action is executable in a case where the check mark is placed in the addressability checkbox 73, and the information that the action is not executable in a case where the check mark is not placed in the addressability checkbox 73.

As described above, the newly entered action information is added to the action information data file 332 illustrated in FIG. 7 by the storage 45. When the same or similar abnormality occurs again, such added action information is provided to the user as a candidate of the action against the abnormality. Thus the user can take a necessary action in a relatively short time.

According to the present embodiment, in a case of occurrence of an abnormality similar to the abnormality of the production device occurring in the past, the action information entered in the past is displayed on the display device 16. Thus, in a case of occurrence of the abnormality in the production device, information indicating the action against the abnormality is provided. Thus in a case of occurrence of the abnormality in the production device, the user can determine the action easily.

The conventionally used system construction support device for the FA system provides the change content of the production device accompanying occurrence of the abnormality in a case of occurrence of the abnormality. Thus a user needs to consider an action to be taken from the change content of the device information before and after the abnormality to take the action against the abnormality. According to the present embodiment, since the cause of the abnormality and the candidate of the action method in a case of occurrence of the abnormality are displayed on the display device 16, thereby reducing effects due to the level of skill of the user and/or the maintenance worker considering the action.

Also, since time for considering the action can be shortened, the action can be taken promptly. This is especially useful in a case of occurrence of an abnormality such as stop of the production device because the greater time for recovery shortens run time of the production device and lowers the amount of production.

Since the searcher 42 calculates the degree of relevance in the present embodiment, display of the action information in accordance with the degree of relevance can be performed.

Since the action information is displayed in descending order of the degree of relevance in the present embodiment, the action having a high possibility of being a proper action as the action against the currently occurring abnormality can be easily found. Also, since the currently and previously created information of the change content of the device information accompanying occurrence of the abnormality is displayed on the change content display screen 6 by pressing the comparison result link 52*a* of FIG. 14, the information can be referred to when a proper action is selected.

Especially in a case where there is the action information 332*c* having a 100% degree of relevance, the action information is displayed based on the action information 332*c* having a 100% degree of relevance. Thus the user of the system construction assistance device does not need to care about which action information is information necessary for a proper action against the current abnormality and can easily determine how to take an action. Such action information 332*c* having a 100% degree of relevance is information about the action taken at the time of the identical change in the device information accompanying occurrence of the abnormality having occurred in the past. Thus the action indicated by this action information 332*c* is an action having a very high possibility of being proper as the action against the currently occurring abnormality.

In addition, in the present embodiment, the display method is changed in a case where the action indicated by the action information 332*c* is quite simple and executable by the user. In step S53 of FIG. 10, only the action method is displayed as illustrated in FIG. 12. Thus, the user does not need to read lots of information and can consider an action to be taken against the abnormality more easily. This is especially useful in a case where a large volume of information is stored as the action information 332*c* or the other information 332*d*.

According to the present embodiment, the action information data file 332 is updated based on the actually taken action in a case of occurrence of the abnormality. Thus, as construction assistance program 30 is used, the action information against the abnormality is accumulated in the action information data file 332. Thus, in a case of occurrence of the abnormality similar to the abnormality occurring in the past, the action information having a higher degree of relevance can be provided. For example, in a case of occurrence of the abnormality as a result of change of the settings of one of the PLCs 2 connected to the computer 1 and the device 3 connected to the PLC 2, the action information is to be accumulated in the action information data file. Then, in a case of occurrence of the abnormality as a result of addition of similar setting change to another PLC 2 and the device 3 connected to the another PLC 2, the action information is to be searched for.

In addition, the information stored in the action information data file 332 can be shared with a company section such as a design section other than a section such as a manufacturing section using the FA system. For example, sharing of the cause of the abnormality stored as the action information 332*c* with the design section can prevent occurrence of an abnormality at a design phase in the design of a similar product. Thus, a quality of the production device can be improved and an occurrence rate of the abnormality can be lowered. Also, sharing of the data stored in the action information data file 332 with other manufacturing bases can provide the action information even in a case where the abnormality occurring at a given base also occurs at another base.

Figure 15:
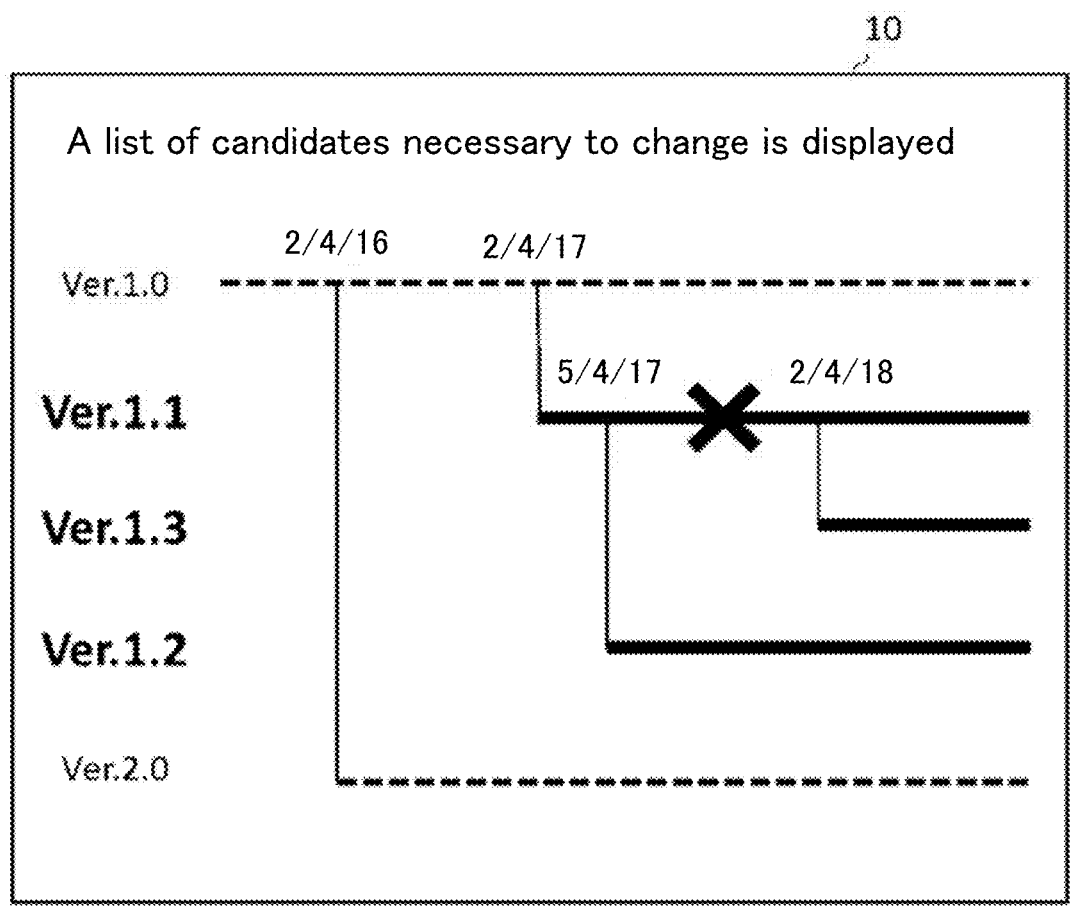
FIG. 15 is a diagram illustrating an example of a change candidate display screen in Embodiment 1.

In the present embodiment, display of the change candidate display screen 10 of FIG. 15 enables the user to know a software version that may be a cause of the abnormality similar to the currently occurring abnormality. Thus, similarly to the above case, sharing of the information with the other section and/or base can prevent occurrence of an abnormality.

Embodiment 2

In step S32 of FIG. 6 of Embodiment 1, the searcher 42 performs a search for the action information using change of all the device information included in the information of the change content created in step S31. The present embodiment is designed to perform search for the action information by limiting the search to change of a preset part of the device information among the information of the change content. An operation of the present embodiment is described mainly focusing on points of differences between Embodiments 1 and 2 with reference to FIGS. 17 to 19.

Figure 17:
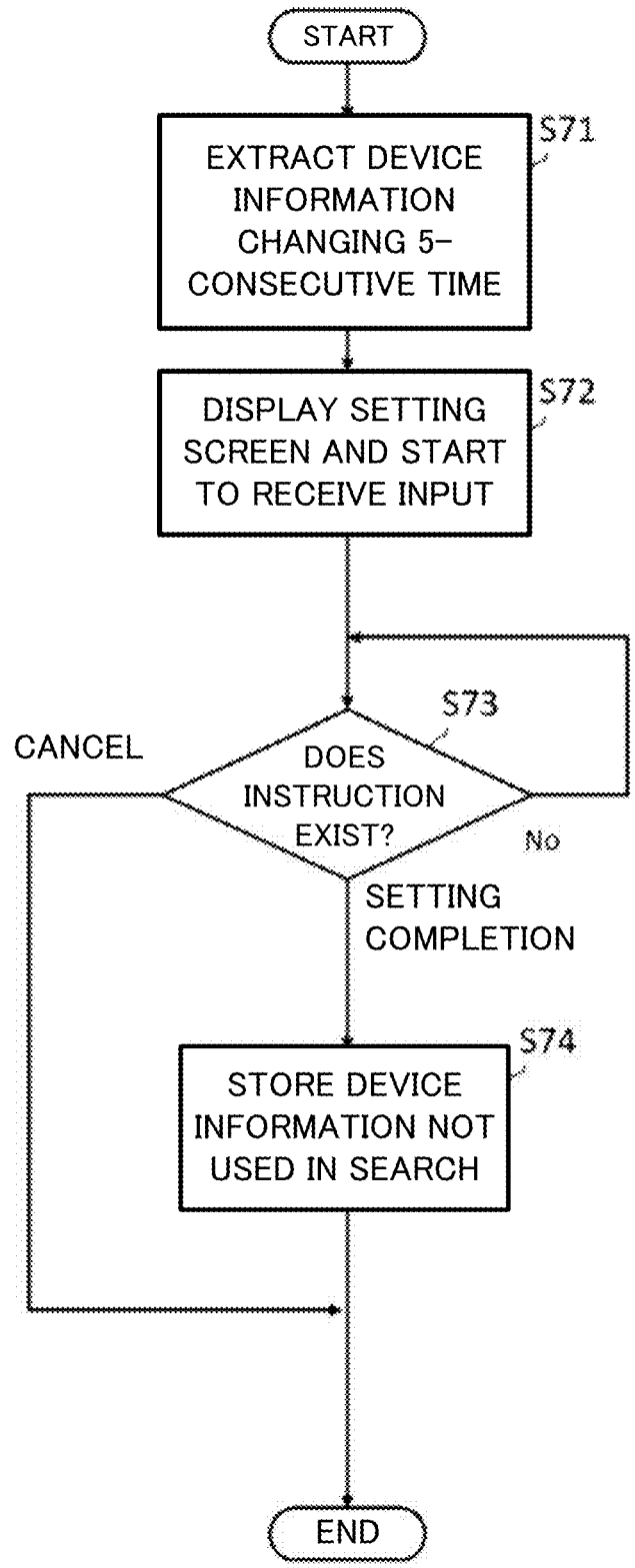
FIG. 17 is a flowchart illustrating a process for setting device information not for use in search executed by a computer in Embodiment 2.

First, control of the computer 1 relating to the setting of the device information is described with reference to FIG. 17. FIG. 17 is a flowchart illustrating a setting process of the device information not for use in the search.

In step S71, the searcher 42 refers to five pieces of history information having the latest history numbers 331*a* among the history information stored in the history data file 331, and extracts device information that changes consecutively five times. Then, a column name in the history data file 331 that is a name of the device information and the latest history information are stored in the RAM 12.

In step S72, which is a setting reception step, the inputter 44 receives an input of the device information not for use in search of the action information. Here, the displayer 43 creates the setting screen 8 illustrated in FIG. 18 based on the name of the device information and the latest history information stored in the RAM 12 in step S71, and displays the setting screen 8 on the display device 16.

Here, the setting screen 8 is described with reference to FIG. 18. The setting screen 8 includes a device information name display 81, a latest history display 82, an exclusion checkbox 83, a scrollbar 84, an exclusion confirmation button 85, and a cancellation button 86.

The device information name display 81 and the latest history display 82 are for displaying the name of the device information and the latest history information extracted by the searcher 42 in step S71. The exclusion checkbox 83 is information representing whether or not the device information is used for search of the action information, and the entry of a check mark indicates the device information excluded from the search. Upon pressing of the exclusion confirmation button 85 or the cancellation button 86 with the setting screen 8 of FIG. 18 displayed, processing of the next step S73 is executed.

In step S73, the inputter 44 determines whether or not the exclusion confirmation button 85 is pressed with the input device 15. In a case where the inputter 44 determines that the exclusion confirmation button 85 is not pressed, that is, the cancellation button 86 is pressed, the input information is not recorded and the processing ends. In a case where the device information not for use in search of the action information is determined, the device information for use in search of the action information is also determined. Thus, checking of the exclusion checkbox 83 can be said to be the same as input for determining the device information use for search of the action information.

Upon the inputter 44 determining that the exclusion confirmation button 85 is pressed, step S74, which is a setting step, is executed. In step S74, the storage 45 stores in the construction assistance program 30 as a list the device information not for use in the search of the action information based on the information input on the setting screen 8. Specifically, as for the exclusion checkbox 83 with the check mark placed in step S72, the device information name described in the device information name display 81 displayed alongside is stored in the storage device 14 as a list.

Figure 19:
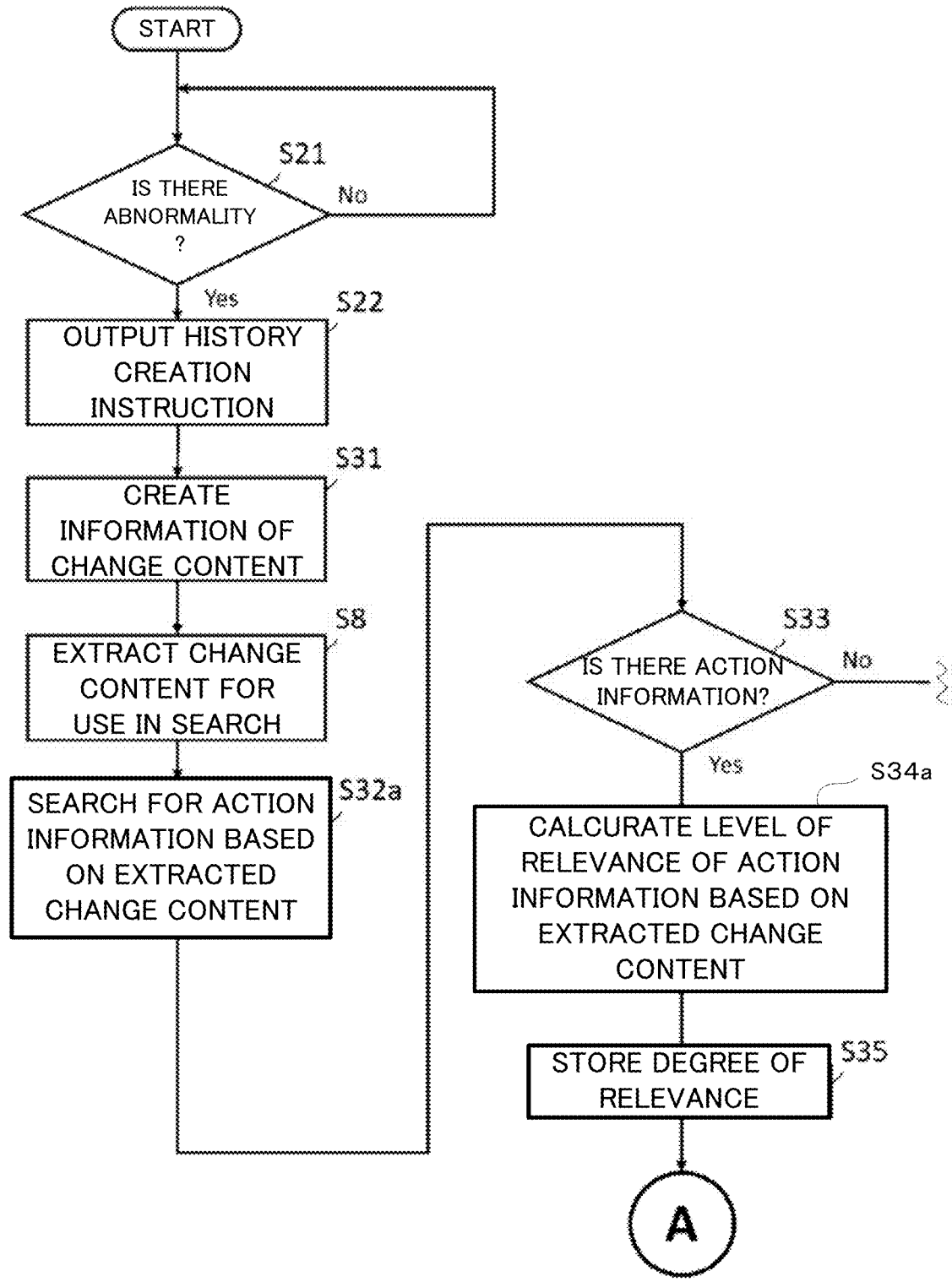
FIG. 19 is a flowchart illustrating an action information searching process executed by the computer in Embodiment 2.

Next, using FIG. 19, control of the computer 1 in search of the action information by the searcher 42 of the present embodiment is described mainly focusing on the difference between Embodiments 1 and 2.

Although the searcher 42 executes processing of step S32 after processing of step S31 of FIG. 6 in Embodiment 1, processing of step S8 is executed after processing of step S31 as illustrated in FIG. 19 in the present embodiment. In step S8, the searcher 42 extracts the change of the device information for use in step S32a.

Specifically, the searcher 42 reads the list stored in the storage device 14 by the storage 45 in step S74 of FIG. 17, and temporarily stores the list in the RAM 12. Then, the device information name of the list is compared with the information of the change content created in step S31. In a case where, among changes of the device information included in the information of the change content, there is a change corresponding to the device information name included in the list, information of the change content excluding the change is created.

Next, the searcher 42 searches for the action information in step S32a. This step S32a is a search step of the present embodiment. In step S32 of Embodiment 1, the searcher 42 compares all the information of the change content of the device information created in step S31 with the change content information 332b of the action information data file 332. In step S32a of the present embodiment, the searcher 42 searches for the action information 332c by comparing the information of the change content extracted in step S8 with the change content information 332b of the action information data file 332. Then, similarly to step S32 of Embodiment 1, when there is even only one matched change of the device information, the searcher 42 stores in the RAM 12 the associated and stored action information 332c and the like.

In the calculation step S34 of FIG. 6 of Embodiment 1, the searcher 42 calculates the degree of relevance by calculating a ratio of matching between the action information 332c stored in the RAM 12 in step S32 and the information of all the change content created in step S31. In the calculation step of the present embodiment, the degree of relevance is calculated by excluding a part of the change content. That is, in step S34a, the searcher 42 calculates the degree of relevance by calculating the ratio of matching between the action information 332c and the information of the change content extracted in step S8.

Specifically, the searcher 42 creates information obtained by excluding, from the change content information 332b, the change of the device information associated with the device information name included in the list stored in the storage device 14 in step S74 of FIG. 17, and temporarily stores the created information in the RAM 12 as the extracted change content information. Then, the searcher 42 calculates the ratio of matching in percentage between the extracted change content information and the information of the change content extracted in step S8.

As for other processing by the searcher 42 except step S32a and step S34a, information of all the change content created in step S31 is used similarly to Embodiment 1. For example, Information of all the change content created in step S31 is displayed on the change content display screen 6 displayed in step S41 of FIG. 9 and step S58 of FIG. 10. Also, information of all the change content created in step S31 is stored in the change content information 332b stored in the storage 45 in step S62a of FIG. 16.

According to the present embodiment, the device information specified by the user from among the device information that is considered to be irrelevant to occurrence of the abnormality such as the information that changes every time the history information is created can be excluded from search of the action information. Thus, information necessary for the action against the abnormality can be provided at a higher accuracy than that in Embodiment 1.

Embodiment 3

In Embodiment 1, the action information data file 332 is stored in the construction assistance program 30 stored in the storage device 14 included in the computer 1. In the present embodiment, the action information data file 332 is stored in the storage device 93 included in a server. The server is an external device provided exterior to the computer 1. Operations of the present embodiment are described mainly focusing on points of differences between Embodiments 1 and 3 with reference to FIGS. 20 and 21. First, the structure of the present embodiment is described with reference to FIG. 20.

Figure 20:
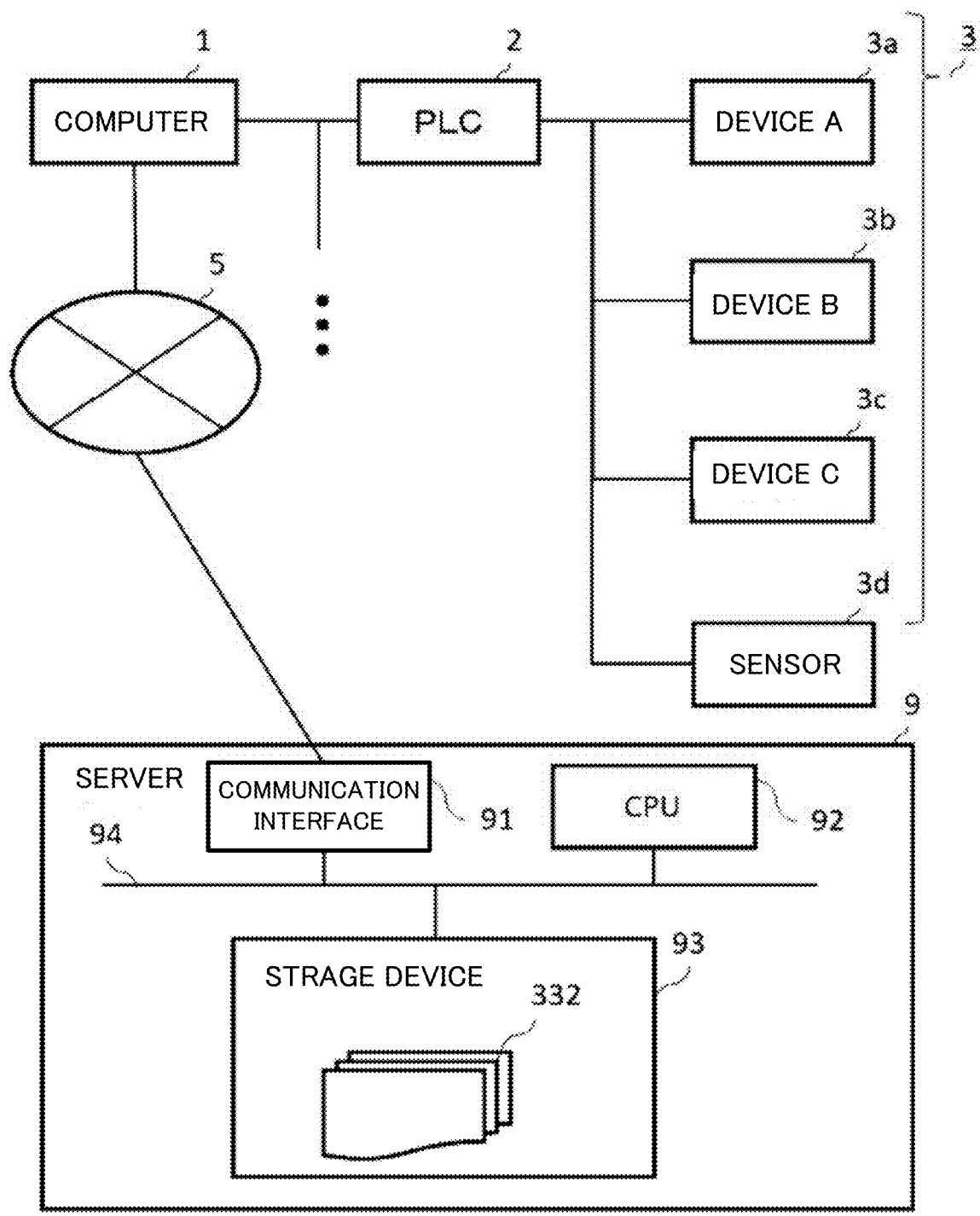
FIG. 20 is a diagram illustrating an overall factory automation system in Embodiment 3.

FIG. 20 is a structure diagram of an overall FA system including the computer 1 and a server 9 connected via the Internet 5 to the FA system in the present embodiment. In the present embodiment, the reception device 17 of the computer 1 is connected via the Internet 5 to the communication interface 91 of the server 9.

The server 9 includes a communication interface 91, a CPU 92, a storage device 93, and an internal bus 94. The communication interface 91, the CPU 92, and the storage device 93 are connected with one another via the internal bus 94. The communication interface 91 is for connecting to the Internet 5 similarly to the reception device 17 of the computer 1. The CPU 92 performs overall control of the server 9. The storage device 93 is a hard disk storing the action information data file 332.

Next, the operations of the present embodiment is described mainly focusing on the differences between Embodiments 1 and 3. First, control of the computer 1 in search of the action information by the searcher 42 of the present embodiment is described with reference to FIG. 6.

In step S32 of Embodiment 1, the searcher 42 searches for the action information for the abnormality from the action information data file 332 in the construction assistance program 30 stored in the storage device 14 of the computer 1. In step S32, which is a search step of the present embodiment, the searcher 42 searches for the action information for the abnormality from the action information data file 332 stored in the storage device 93 of the server 9 via the reception device 17 and the Internet 5, ad proceeds with the processing to go to step S33.

Specifically, in step S32, the searcher 42 creates an extraction instruction based on the information of the change content created in step S31 and the address of the server 9, and outputs the extraction instruction to the reception device 17 via the reception device 17 and to the server 9 via the Internet 5. The server 9 having received the output information from the communication interface 91 compares the information of the received change content with the change content information 332b of the action information data file 332. Then, when there is even only one matched change of the device information, the server 9 outputs the action information 332c, the other information 332d, and the addressability information 332e that are associated with the action number 332a that is the same as that of the change content information 332b including the matched change of the device information, and the change content information 332b, via the communication interface 91 and the Internet 5 to the computer 1. The searcher 42 receives the information via the reception device 17 and temporarily stores the information in the RAM 12.

In the present disclosure, the search of the action information for the abnormality by the searcher 42 includes processing of outputting to the external device the extraction instruction as in the present embodiment and temporarily storing in the RAM 12 the information received from the external device.

Next, control of the computer 1 in registration of the action information by the inputter 44 and the storage 45 of the present embodiment is described with reference to FIG. 21.

In step S62a of FIG. 16 of Embodiment 1, the storage 45 updates the action information data file 332 in the construction assistance program 30 based on the information entered in registration screen 7, and the processing ends. In the present embodiment, the storage 45, in place of step S62a, performs processing of step S62b illustrated in FIG. 21.

In step S62b, which is a storage step, the storage 45 registers the action information in the action information data file 332 by outputting the information entered in the registration screen 7, and the processing ends. Specifically, the storage 45 creates the output information based on the current date acquired from the information entered in the registration screen 7 and the OS, and the address of the server 9, and transmits the output information to the reception device 17 and via the Internet 5 to the server 9.

The server 9 having received the output information from the communication interface 91 updates based on the output information the action information data file 332 stored in the storage device 93. Specifically, the server 9 stores the change content information 332b, the action information 332c, the other information 332d, and the addressability information 332e associated with the new history number 331a, similarly to the storage 45 of Embodiment 1.

In the present disclosure, the storage of the action information performed by the storage 45 includes processing of storing the action information in the action information data file 332 provided in the external server 9 as in the present embodiment.

According to the present embodiment, an update of the action information data file 332 is stored in the server 9. Thus all the computers 1 connected to the server 9 can share the same action information data file 332. This is especially useful in a case where the computer 1 that is the system construction assistance device is used in a plurality of manufacturing bases because this can achieve immediate sharing of the data stored in the action storage data file 332 with another user, and provide the action information more efficiently than in Embodiment 1 even in a case where the abnormality occurring at a certain base also occurs at another base.

Although the embodiments are described above, the present disclosure is not limited to these embodiments. Modified examples are described below.

In the embodiments, the production device is the PLC 2 and the device 3 connected to the PLC 2, but the production device is not limited thereto and may be any device included in the FA system. For example, the production device may be the device 3 directly connected to the computer 1 not via the PLC 2, or may be another device further connected to the device 3 connected to the PLC 2. Although the computer 1 acquires the device information from the PLC 2 in the embodiments, the device information is not limited thereto and may be any information that include setting information. For example, the device information may be obtained by the computer 1 directly from the device 3 or may be setting information of the device 3 set by the computer 1. Also, the device information is not, of course, limited to that described in the embodiments. For example, the state information may be a current temperature of the device 3, tilt of the place where the device 3 is disposed, or age of service of the device 3.

The hardware configuration of the embodiments are not limited to that described and may be any configuration that can fulfill a similar function. For example, in the embodiments, the storage device 14 of the computer 1 and the storage device 93 of the server 9 are each a hard disk, but may be the other storage devices, such as a flash memory. Also, the software is not limited to that described software and may be any software that fulfill a similar function.

The construction assistance program 30 described in the embodiments are distributed by a manufacturer or the like via a non-transitory computer-readable recording medium such as CD-ROM. However, the program is not limited thereto and may be downloaded via a communication network such as the Internet 5. In this case, the server from which the program is to be downloaded corresponds to a non-transitory computer-readable storage medium storing the construction assistance program 30. Also, the storage device 14 of the computer 1 with the construction assistance program 30 installed therein corresponds to a non-transitory computer-readable storage medium storing the construction assistance program 30.

In step S11 of FIG. 4 of the embodiments, in a case of an instruction being manually made using the input device 15, upon passage of a certain time period, or in a case of occurrence of the abnormality in the production device, the history creation instruction is output from the searcher 42, but such configuration is not limited thereto to solve the problem. For example, the history creation instruction may be output based on change of input from production device, such as in a case where the power supply of the device 3 is turned off or the connection is changed.

The timing of creating the history may depend on the types of the device information. For example, among the state information, the history may be created constantly for a temperature, the history may be created every five seconds for the production piece count information 331b, or the history may be created for the setting information upon an instruction being manually made.

Storing of the device information in the history creation step may be performed as long as the device information is stored to be referred to for use in the search by the searcher 42. That is, the storing is not limited to a case where the device information is stored as the history information in the history data file 331 of a non-volatile storage medium such as the storage device 14 of the embodiments. For example, a case is included where the several latest items of device information are stored in the RAM 12 using the RAM 12 as the storage device.

In the embodiments, the searcher 42 outputs the output instruction of the abnormality occurrence information to the PLC 2 and obtains the abnormality occurrence signal from the PLC 2. However, such configuration is not limited thereto to solve the problem. For example, input of the abnormality occurrence signal from the sensor 3d may be received all the time, or presence or absence of the abnormality may be determined by analyzing the state information. The determination of the presence or absence of the abnormality by analysis of the state information is, for example, determination made that an abnormality occurs in a case where the production piece count information 331b of the history data file 331 indicating the production piece count per second is less than fixed piece count, or the like.

In the embodiments, the abnormality is an abnormality determined by the sensor 3d, but the type of the abnormality is not limited thereto and may be any type that can be recognized by the computer 1. For example, the type of the abnormality may be one occurring in the production device itself, such as the abnormality of the temperature of the device 3 detected by a temperature sensor, or determined from a plurality of products, such as a defective item rate in the products produced by the FA system. Also, various types of the abnormality may be recognized using the plurality of sensors 3d.

In the embodiments, the searcher 42 searches for the action information based on the information of the change content of the device information accompanying occurrence of the abnormality created from two latest items of history information stored in the history data file 331. However, to solve the problem, the search for the action information is not limited to this method and may be any method that searches for the action information based on the change content of the device information accompanying occurrence of the abnormality. For example, the device information after occurrence of the abnormality, without storage in the history data file 331, may be combined with the one latest history information stored in the history data file 331 to create information of the change content and may be used for search.

All the information for use in search of the action information described in the embodiments is made based on change of the device information. However, the search of the action information by the searcher 42 may be performed together with the other information. For example, search may be performed after narrowing the action information down using information, such as a model number of the PLC2, that cannot change with the occurrence of the abnormality. Also, the search may be performed together with information of the date of searching of the action information for the abnormality effected by temperature and/or humidity. Of course, the device information that does not change with occurrence of the abnormality may be used for the search.

In the embodiments, the device information before and after occurrence of the abnormality for use in search of the action information is the history information immediately before and after of the abnormality stored in the history data file 331, but such configuration is not limited thereto to solve the problem. For example, information of an average or highest frequency of occurrence of the device information immediately before and after occurrence of the abnormality may be used. Alternatively, although search accuracy might be lowered, the history information several times earlier or several times later may be used.

In the embodiments, the degree of relevance is calculated by the searcher 42 from a ratio of matching between the change of the device information included in the change content information 332b and the change of the device information included in the information of the change content created in step S31, but the method for calculating the degree of relevance is not limited thereto. For example, a weight may be assigned to each piece of device information instead of using a simple ratio of matching.

The search of the action information and calculation of the degree of relevance may be performed using known artificial intelligence (AI) techniques. For example, a case is described where the change content of the device information accompanying occurrence of the abnormality and the action information corresponding to the change content of the device information are input as learning data, and a learned model for inferring the action information for the abnormality is created using the learning data in accordance with a neural network model from the change content of the device information accompanying occurrence of the abnormality.

In the embodiments, the searcher 42 extracts all the action information 332c for which the change of the device information included in the change content information 332b matches even a single piece of information of the change content included in the information of the change content created in step S31 of FIGS. 6 and 19. The search of the action information is not limited to this method to solve the problem. For example, the above learned model may be stored in the construction assistance program 30 instead of the action information data file 332 and the search may be performed by inferring the action information from the information of the change content created in step S31. Also, an output value with respect to each piece of action information output at this time may be used as a degree of relevance.

In the embodiments, the degree of relevance is calculated as a percentage, but of course, may be calculated in another units. Also, in step S51 of FIG. 10 of the embodiment, the displayer 43 determines whether or not the degree of relevance of the action information 332c having the highest degree of relevance is 100%. However, in step S53 and step S54, to reduce the burden of the user by displaying one action method and one item of action information, the processing of step S51 is not limited to determination as to whether the degree of relevance is 100%.

That is, the processing of step S51 is sufficient as long as the processing determines whether or not the degree of relevance of the action information 332c having the highest degree of relevance is equal to or greater than a predetermined threshold. In other words, it is sufficient that in the later steps S53 and S54, in a case where the degree of relevance of the action information 332c having the highest degree of relevance is equal to or greater than the predetermined threshold, one item of action information 332c having the highest degree of relevance or one action method included may be displayed. For example, in a case where the threshold is previously set as 97% and the degree of relevance of the action information 332c having the highest degree of relevance is 98%, the displayer 43 may proceed with the processing to go to step S52. Also, in a case where the degree of relevance of the action information 332c having the highest degree of relevance is equal to or greater than the predetermined threshold and the action is executable by the user, one item of action information 332c may be displayed.

In step S51 of the embodiments, in a case where the degree of relevance of the action information 332c having the highest degree of relevance is less than 100%, which is predetermined threshold, the displayer 43 proceeds with the processing to go to step S56. However, in step S56, the processing of step S51 can be omitted in order to obtain an effect that an action having a high possibility of being proper as an action against the abnormality can be found easily by displaying the action information 332c in descending order of the degree of relevance. That is, regardless of the degree of relevance of the action information 332c having the highest degree of relevance being smaller than the threshold, the action information may be displayed on the action information list display screen 52 on descending order of the degree of relevance.

In the embodiments, determination performed in step S52 of FIG. 10 as to whether the action indicated by the action information 332c is executable by the user is performed for the action information 332c having a 100% degree of relevance in step S51. However, without the processing of step S51, the determination may be made on all the action information 332c searched for in step S32 of FIG. 6 to determine a method for displaying the action information in the subsequent processing.

In the embodiments, step S53 of FIG. 10 is for displaying only the action method. However, another method may be displayed to obtain an effect that is enablement of easy consideration of the action by the user. That is, in a case where the action is determined to be executable by the user, displaying items on the display device 16 that are less than the items displayed on the display device 16 in a case where determination is made that the action is not executable by the user is sufficient. The "item" is a cause of the abnormality such as a cause of the abnormality or the action method and/or types of the other information such as the action day.

In the embodiments, the definition as to whether the action is executable by the user is made based on entry into the addressability checkbox 73 in step S62 of FIG. 16. However, the method of definition is not limited thereto. For example, the definition may be made using known AI techniques.

As for the definition made by the known AI technique as to whether or not the action is executable by the user, for example, the action method and information as to whether the action is executable by the user associated with the action method may be input as learning data, and a learned model may be created for inferring whether the action is executable by the user from characters entered in the action method entry field 71 using the learning data.

In the embodiments, the action method display screen 53, the action information display screen 51, and the action information list display screen 52 are described as a display method for the action information. However, to solve the problem, the display method may be any method with which the action information is displayed. In a case where determination is made that there is action information in step S33, to solve the problem, all the searched-for action information may be displayed without performing determination as to the degree of relevance and/or whether the action is executable. Also, the display of the action information is not limited to text data stored in the action information data file 332 as the action information 332c, but may be a different representation created therefrom.

In the embodiments, the action information may be a cause of the abnormality and an action method for the abnormality. The action information is not limited thereto and may be any information that indicates an action. For example, in a case where the action can be taken easily by the user with the cause portion found, a part that causes the abnormality such as a "part P" may be stored alone as the action information 332C.

In the embodiments, in step S59 and step S59x of FIG. 10, a link displayed in a case where the cause being a version change of a software is stored in the action information 332c and the address of the development history information is stored as the remark included in the other information 332d is for displaying the change candidate display screen 10 when the link is pressed. However, as long as the change candidate display screen 10 is displayed in a case where the action information searched for by the searcher 42 indicates that the cause of the abnormality is a version change of the software, the change candidate display screen 10 may be displayed based on the other conditions. For example, whenever the cause being the version change of the software is stored in the action information 332c, the development history of the software may be searched for from the construction assistance program 30 and the change candidate display screen 10 may be displayed.

The change candidate display screen 10 is not limited thereto and may be any screen that displays, based on the development history of the software, the version of the software having a possibility of causing an abnormality similar to the abnormality occurring in the production device. For example, the change candidate display screen 10 may be a list of the versions of that software in text.

Figure 21:
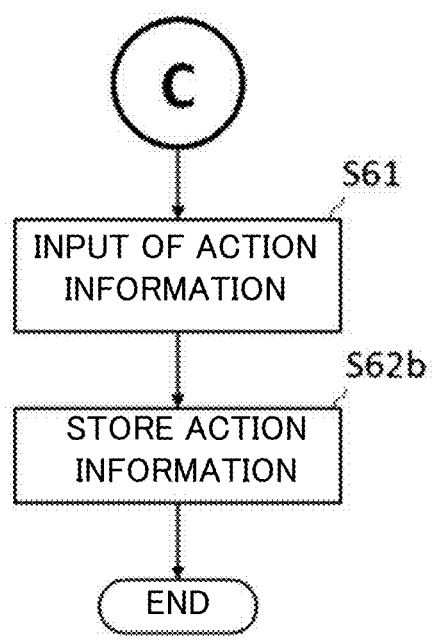
FIG. 21 is a flowchart illustrating an action information storing process executed by a computer in Embodiment 3.

In the embodiments, the action information 332c stored in the action information data file 332 or the like are stored in step S62a of FIG. 16 and step S62b of FIG. 21. Of course, there may be action information 332c that is previously stored. Also, in the embodiments, in a case where the abnormality is detected and, particularly, there is not action information 332c having a 100% degree of relevance in step S51, the action information is stored in the action information data file 332. Of course, regardless of the result in step S51, the action information may be stored in the action information data file 332. In this case, in step S53 and step S54, either item, for example, one latest item of information may be displayed.

In step S71 of FIG. 17 of Embodiment 2, the searcher 42 extracts, as candidate of the device information not for use in search, the device information that changes every time in the last several times from the history data file 331. However, for example, the device information as candidate of the device information not for use in search may be selected from all the device information or may be extracted based on a condition different from changes of the history information in the history data file 331. Also, the searcher 42 may, although heretofore storing device information not used in the search, conversely select and store device information used in the search.

In step S8 of FIG. 19 of Embodiment 2, the searcher 42 extracts a change of the device information for use in search from the information of the change content created in step S31. Instead of this, in the processing of step S31, the searcher 42 may create, based on the list stored by the searcher 42 in the storage device 14 in step S74 of FIG. 17, information of the change content except information associated with the device information name included in the list.

In Embodiment 3, the external device is the server 9, but the external device is not limited thereto to obtain an effect of sharing the data stored in the action information data file 332 with another user immediately. For example, the external device may be a computer 1 used in another base.

Although in Embodiments 2 and 3, points of changes from Embodiment 1 are mainly described, these embodiments may be, of course, combined with one another.

REFERENCE SIGNS LIST

1 Computer
2 PLC
3 Device
3a Device A
3b Device B
3c Device C
3d Sensor

5 Internet
6 Change content display screen
7 Registration screen
8 Setting screen
9 Server
10 Change candidate display screen
11 CPU
12 RAM
13 ROM
14 Storage device
15 Input device
16 Display device
17 Reception device
18 Internal bus
30 Construction assistance program
41 History creator
42 Searcher
43 Displayer
44 Inputter
45 Storage
51 Action information display screen
51a Cause display
51b Action method display
51c Action date display
51d Remark display
51e End button
52 Action information list display screen
52a Comparison result link
52b Relevance display
52c Cause display
52d Action method display
52e Action day display
52f Remark display
52g Scrollbar
52h Registration start button
52l Candidate link
53 Action method display screen
53a Action method display
53b End button
60 Device information display
61 Data number
62 Type name display
63 Data name display
64 Pre-abnormality display
65 Post-abnormality display
66 Change display
67 Scrollbar
68 Pre-abnormality waveform data display
68a Pre-abnormality production piece count waveform
68b Pre-abnormality production total count waveform
69 Post-abnormality waveform data display
69a Post-abnormality production piece count waveform
69b Post-abnormality production total count waveform
610 Registration start button
71 Action method entry field
72 Cause entry field
73 Addressability checkbox
74 Remark entry field
75 Registration button
81 Device information name display
82 Latest history display
83 Exclusion checkbox
84 Scrollbar
85 Exclusion confirmation button
86 Cancellation button
91 Communication interface
92 CPU
93 Storage device
94 Internal bus
331 History data file
331a History number
331b Production piece number information
331c Setting a information
331d Software w information
332 Action information data file
332a Action number
332b Change content information
332c Action information
332d Other information
332e Addressability information

The invention claimed is:

1. A non-transitory computer-readable recording medium storing a system construction assistance program, the system construction assistance program causing a computer to execute instructions comprising:
receiving, using a reception device, a plurality of pieces of setting information indicating settings of a production device included in a production system and storing a history of the plurality of pieces of setting information in a storage device;
when an abnormality in the production device occurs, receiving, from an input device, an input signal of action information indicating an action against the abnormality;
comparing, from the history of the plurality of pieces of setting information stored in the storage device, a piece of setting information before occurrence of the abnormality with a piece of setting information after occurrence of the abnormality to extract a change content and storing, in the storage device, the input signal of the action information in association with the extracted change content;
when an abnormality of the production device occurs after storing of the input signal of the action information in association with the extracted change content, searching for the action information for the abnormality occurring in the production device from among the action information stored in the storage device, using as a search condition the extracted change content; and
displaying the action information searched for on the display device.

2. The non-transitory computer-readable recording medium according to claim 1, the system construction assistance program causing the computer to execute the instructions further comprising:
when there is a plurality of pieces of the action information, calculating a degree of relevance of each piece of action information based on a degree of match between the change content stored in the storage device and the change content used as the search condition, wherein
the displaying includes displaying the action information in accordance with the calculated degree of relevance.

3. The non-transitory computer-readable recording medium according to claim 2, wherein the displaying includes displaying the plurality of pieces of action information in descending order of the calculated degree of relevance.

4. The non-transitory computer-readable recording medium according to claim 2, wherein, when the degree of relevance of the action information whose calculated degree of relevance is highest is equal to or greater than a predetermined threshold, the displaying includes displaying a single piece of action information having the highest degree of relevance.

5. The non-transitory computer-readable recording medium according to claim 2, wherein
the storage device is included in an external device provided externally of the computer, and
the storing includes storing the action information by outputting the received input of the action information to the external device.

6. The non-transitory computer-readable recording medium according to claim 2, wherein the action information searched for indicates an action of changing setting information other than the setting information having the piece of setting information after occurrence of the abnormality changed in comparison with the piece of setting information before occurrence of the abnormality among the plurality of pieces of setting information indicating the settings of the production device.

7. The non-transitory computer-readable recording medium according to claim 3, wherein
the storage device is included in an external device provided externally of the computer, and
the storing includes storing the action information by outputting the received input of the action information to the external device.

8. The non-transitory computer-readable recording medium according to claim 3, wherein the action information searched for indicates an action of changing setting information other than the setting information having the piece of setting information after occurrence of the abnormality changed in comparison with the piece of setting information before occurrence of the abnormality among the plurality of pieces of setting information indicating the settings of the production device.

9. The non-transitory computer-readable recording medium according to claim 4, wherein when the degree of relevance of the action information whose calculated degree of relevance is highest among the plurality of pieces of action information searched for is less than the predetermined threshold, the displaying includes displaying the plurality of pieces of action information in descending order of the calculated degree of relevance.

10. The non-transitory computer-readable recording medium according to claim 4, wherein
the storage device is included in an external device provided externally of the computer, and
the storing includes storing the action information by outputting the received input of the action information to the external device.

11. The non-transitory computer-readable recording medium according to claim 4, wherein the action information searched for indicates an action of changing setting information other than the setting information having the piece of setting information after occurrence of the abnormality changed in comparison with the piece of setting information before occurrence of the abnormality among the plurality of pieces of setting information indicating the settings of the production device.

12. The non-transitory computer-readable recording medium according to claim 9, wherein
the storage device is included in an external device provided externally of the computer, and
the storing includes storing the action information by outputting the received input of the action information to the external device.

13. The non-transitory computer-readable recording medium according to claim 1, wherein
the storage device is included in an external device provided externally of the computer, and
the storing includes storing the action information by outputting the received input of the action information to the external device.

14. The non-transitory computer-readable recording medium according to claim 1, wherein the action information searched for indicates an action of changing setting information other than the setting information having the piece of setting information after occurrence of the abnormality changed in comparison with the piece of setting information before occurrence of the abnormality among the plurality of pieces of setting information indicating the settings of the production device.

15. The non-transitory computer-readable recording medium according to claim 1, wherein
the production system includes a plurality of production devices, and the plurality' of pieces of setting information is information indicating settings of each production device, and
the action information searched for indicates an action relating to a production device other than a production device with the setting information having the piece of setting information after occurrence of the abnormality changed in comparison with the piece of setting information before occurrence of the abnormality among the plurality of production devices.

16. The non-transitory computer-readable recording medium according to claim 1, the system construction assistance program causing the computer to execute the instructions further comprising:
receiving an input for determining the setting information to be used as the search condition for the action information; and
setting the setting information to be used for search of the action information based on the received input for determining the setting information to be used as the search condition for the action information, wherein
the searching includes searching for the action information using as the search condition the change content of the set setting information among the change content.

17. The non-transitory computer-readable recording medium according to claim 1, the system construction assistance program causing the computer to execute the instructions further comprising:
determining whether or not the action indicated by the action information searched for is executable by a user, wherein
when the determination is made that the action is executable by the user, the displaying includes displaying, on the display device, a number of items less than a number of items to be displayed on the display device in a case where the determination is made that the action is not executable by the user.

18. The non-transitory computer-readable recording medium according to claim 1, the system construction assistance program causing the computer to execute the instructions further comprising:
when the action information searched for indicates that a cause of the abnormality is a version change of software, displaying, on the display device based on a development history of the software, a version of the software that has a possibility of causing an abnormality similar to the abnormality occurring in the production device.

19. A system construction assistance method, comprising:
receiving, by a system construction assistance device using a reception device, a plurality of pieces of setting information indicating settings of a production device included in a production system and storing a history of the plurality of pieces of setting information in a storage device;

when an abnormality in the production device occurs, receiving, by the system construction assistance device from an input device, an input signal of action information indicating an action against the abnormality;

comparing, by the system construction assistance device from the history of the plurality of pieces of setting information stored in the storage device, a piece of setting information before occurrence of the abnormality with a piece of setting information after occurrence of the abnormality to extract a change content and storing, in the storage device, the input signal of the action information in association with the extracted change content;

when an abnormality in the production device occurs after storing of the input signal of the action information in association with the extracted change content, searching, by the system construction assistance device, for the action information for the abnormality occurring in the production device from among the action information stored in the storage device, using as a search condition the extracted change content; and displaying, by the system construction assistance device, the action information searched for on the display device.

20. A system construction assistance device, comprising:

a history creator to receive, using a reception device, a plurality of pieces of setting information indicating settings of a production device included in a production system and store a history of the plurality of pieces of setting information in a storage device;

an inputter to receive from an input device, when an abnormality in the production device occurs, an input signal of action information indicating an action against the abnormality;

a storage to compare, from the history of the plurality of pieces of setting information stored in the storage device, a piece of setting information before occurrence of the abnormality with a piece of setting information after occurrence of the abnormality to extract a change content and store, in the storage device, the input signal of the action information input by the inputter in association with the extracted change content;

a searcher to search, when an abnormality in the production device occurs, for the action information for the abnormality from among the action information stored in the storage device by the storage, using as a search condition the extracted change content; and a display to display the action information searched for by the searcher on the display device.

* * * * *